US009475591B2

(12) United States Patent
Dula

(10) Patent No.: US 9,475,591 B2
(45) Date of Patent: Oct. 25, 2016

(54) SPACE LAUNCH APPARATUS

(71) Applicant: Arthur McKee Dula, Houston, TX (US)

(72) Inventor: Arthur McKee Dula, Houston, TX (US)

( * ) Notice: Subject to any disclaimer, the term of this patent is extended or adjusted under 35 U.S.C. 154(b) by 89 days.

(21) Appl. No.: 14/547,543

(22) Filed: Nov. 19, 2014

(65) Prior Publication Data

US 2015/0375875 A1    Dec. 31, 2015

Related U.S. Application Data

(60) Provisional application No. 61/906,086, filed on Nov. 19, 2013, provisional application No. 62/041,050, filed on Aug. 23, 2014.

(51) Int. Cl.
*B64G 1/40* (2006.01)
*B64G 1/64* (2006.01)
*B64G 1/00* (2006.01)

(52) U.S. Cl.
CPC .............. *B64G 1/002* (2013.01); *B64G 1/401* (2013.01); *B64G 1/402* (2013.01)

(58) Field of Classification Search
CPC ........ B64G 1/002; B64G 1/40; B64G 1/401; B64G 1/402; B64G 1/64; B64G 1/641; B64G 1/645
See application file for complete search history.

(56) References Cited

U.S. PATENT DOCUMENTS

| | | | | |
|---|---|---|---|---|
| 3,180,084 A | * | 4/1965 | Meeks | B64G 1/26 239/265.19 |
| 3,304,724 A | * | 2/1967 | Blumrich | F02K 9/605 220/653 |
| 3,825,211 A | * | 7/1974 | Minovitch | B64G 1/409 244/171.1 |
| 4,451,017 A | * | 5/1984 | Marshall | B64G 1/002 244/172.2 |
| 4,699,339 A | * | 10/1987 | Rosen | B64G 1/14 244/172.2 |
| 4,817,890 A | * | 4/1989 | Coffinberry | F02K 9/605 244/135 R |
| 4,943,014 A | * | 7/1990 | Harwood | B64G 1/007 244/158.5 |
| 5,667,167 A | * | 9/1997 | Kistler | B64G 1/002 244/110 E |
| 6,491,258 B1 | * | 12/2002 | Boyd | B64G 1/007 244/158.1 |
| 6,536,712 B1 | * | 3/2003 | Barenett | B64G 1/10 244/158.3 |
| 6,685,141 B2 | * | 2/2004 | Penn | B64G 1/002 244/171.1 |
| 6,793,183 B1 | * | 9/2004 | Hand | B64G 1/641 244/158.1 |
| 7,559,508 B1 | * | 7/2009 | Taylor | B64G 1/002 244/159.4 |
| 7,686,255 B2 | * | 3/2010 | Harris | B64G 1/222 244/159.4 |
| 2011/0297795 A1 | * | 12/2011 | Jaeger | B64G 1/10 244/171.1 |
| 2013/0299669 A1 | * | 11/2013 | Laurens | F16F 15/08 248/573 |
| 2015/0144738 A1 | * | 5/2015 | Soulier | B64G 1/242 244/158.6 |

* cited by examiner

*Primary Examiner* — Christopher P Ellis
*Assistant Examiner* — Michael Wang
(74) *Attorney, Agent, or Firm* — Law Office of Art Dula; Arthur M. Dula; Rusha Desai

(57) ABSTRACT

A space launch apparatus comprising a solid triangular space frame constructed of a plurality of connected truss members that are attached to each other at nodes and are also attached to at least one rocket motor and to at least one payload whereby the force produced by the operation of the rocket motor is transferred to the payload and aerodynamic and vibration loads are distributed through the truss members and their nodes.

24 Claims, 22 Drawing Sheets

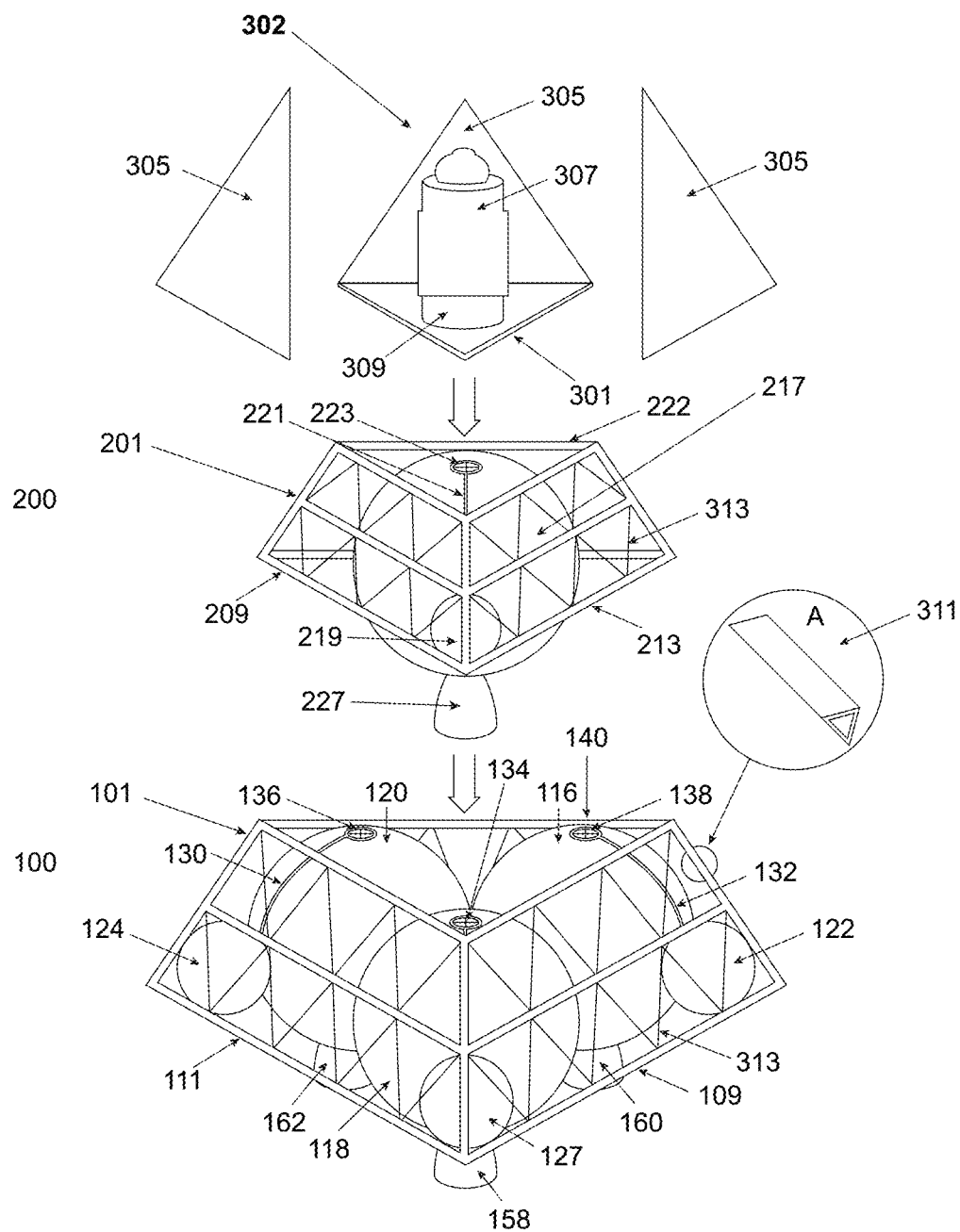

*Propellant mass fraction for ballistic launch vehicles.*

*Approximating a circular plan form reference area.*

*Drag coefficients assumed for Bulldog.*

FIG 13.
*Mass Properties for Scaled Bulldog Launch Vehicles.*

|  | Bulldog 1 (Zenit equiv) meters | Bulldog 2 (S-V equiv) meters | Bulldog 3 (Sea D. equiv) meters |
|---|---|---|---|
| Height | 17.84 | 28.91 | 46.67 |
| Diameter | 20.39 | 33.04 | 54.31 |

|  | mt | mt | mt |
|---|---|---|---|
| GLOW | 895.3 | 4321.1 | 21338.0 |
|  |  |  |  |
| Stage 1 | 705.1 | 3528.9 | 15076.6 |
| Burnout | 69.1 | 282.3 | 1145.8 |
| Propellant | 636.0 | 3246.6 | 13930.8 |
|  |  |  |  |
| Stage 2 | 176.3 | 672.2 | 5752.9 |
| Burnout | 16.9 | 52.7 | 434.4 |
| Fairings | 0.4 | 1.1 | 2.9 |
| Propellant | 159.0 | 618.4 | 5315.7 |
|  |  |  |  |
| Payload | 13.9 | 120.0 | 508.5 |

| pmf | 0.902 | 0.920 | 0.924 |
|---|---|---|---|
| % 2nd stage propellant to total | 20.00 | 16.00 | 27.62 |

FIG 14.
POST Trajectory Events for Bulldog Vehicles.

| Trajectory Event | Bulldog 1 (Zenit equiv) seconds | Bulldog 2 (S-V equiv) seconds | Bulldog 3 (Sea D. equiv) seconds |
|---|---|---|---|
| Liftoff | 0 | 0 | 0 |
| Maximum dynamic pressure | 62 | 67 | 67 |
| Mode 2 thrust | 70 | 70 | 70 |
| First stage burnout | 178 | 191 | 170 |
| First stage jettison | 180 | 193 | 172 |
| Second stage ignition | 186 | 198 | 178 |
| Fairings jettison | 295 | 295 | 295 |
| Second stage burnout | 485 | 473 | 545 |

FIG 15.
*Comparison of Bulldog scaled vehicles with Zenit, Saturn V and Sea Dragon Launch Vehicles.*

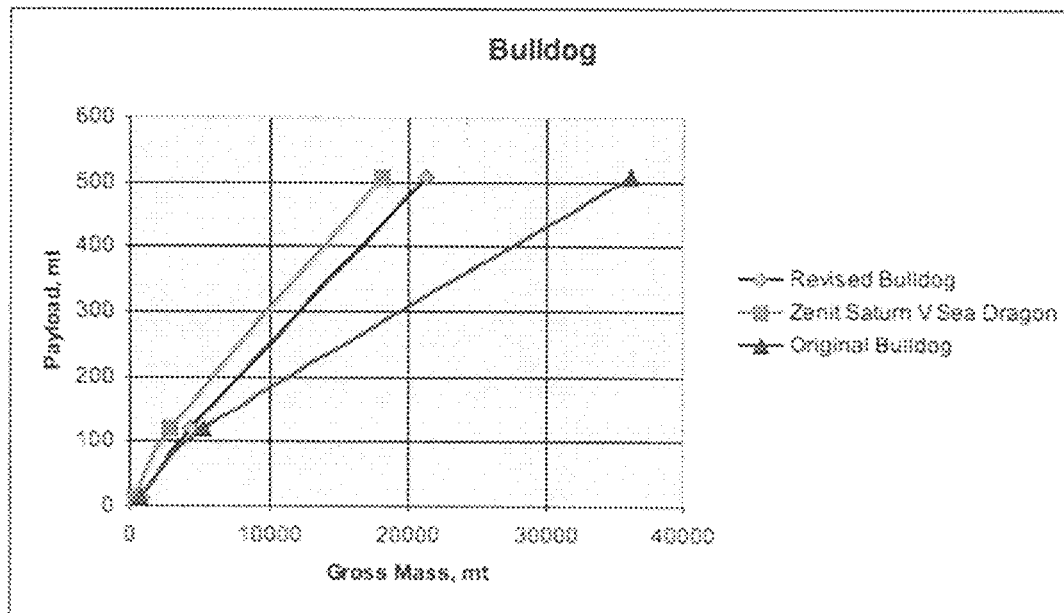

*Altitude and Flight-Path-Angle Histories (Bulldog 1)*

*Relative Velocity and Acceleration Histories (Bulldog 1)*

*Dynamic Pressure and Drag/Thrust Histories (Bulldog 1)*

FIG 19.
*Altitude and Flight-Path-Angle Histories (Bulldog 2)*
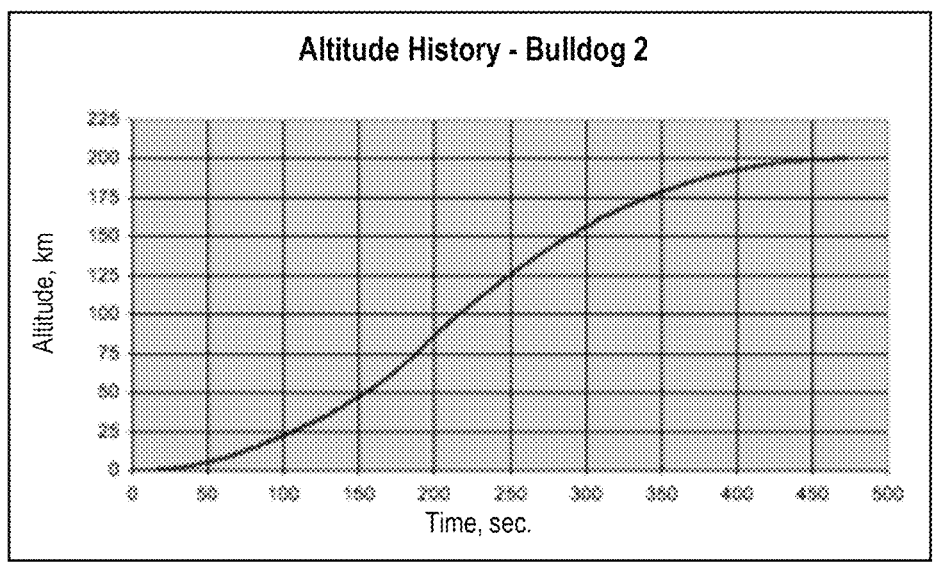
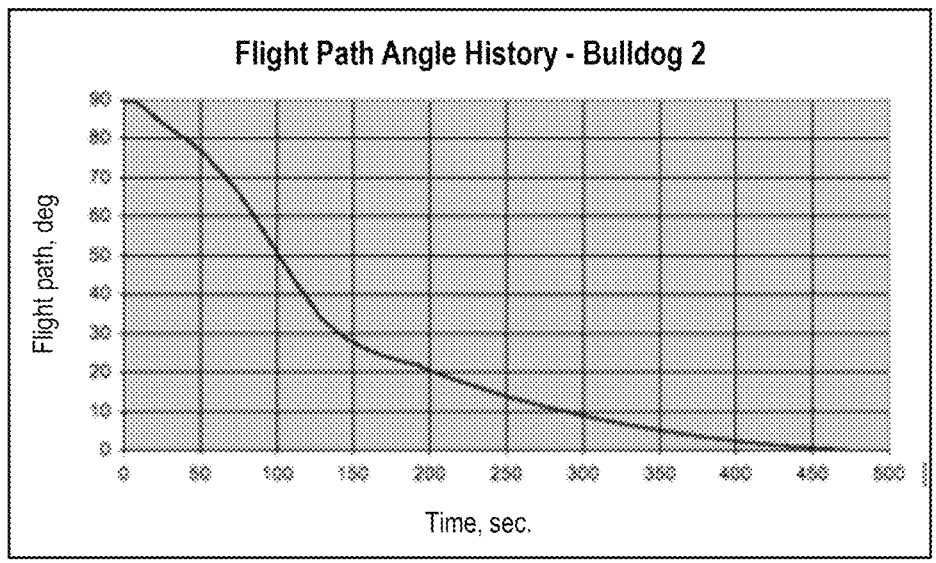

*Relative Velocity and Acceleration Histories (Bulldog 2)*

*Dynamic Pressure and Drag/Thrust Histories (Bulldog 2)*

FIG 22.
*Altitude and Flight-Path-Angle Histories (Bulldog 3)*
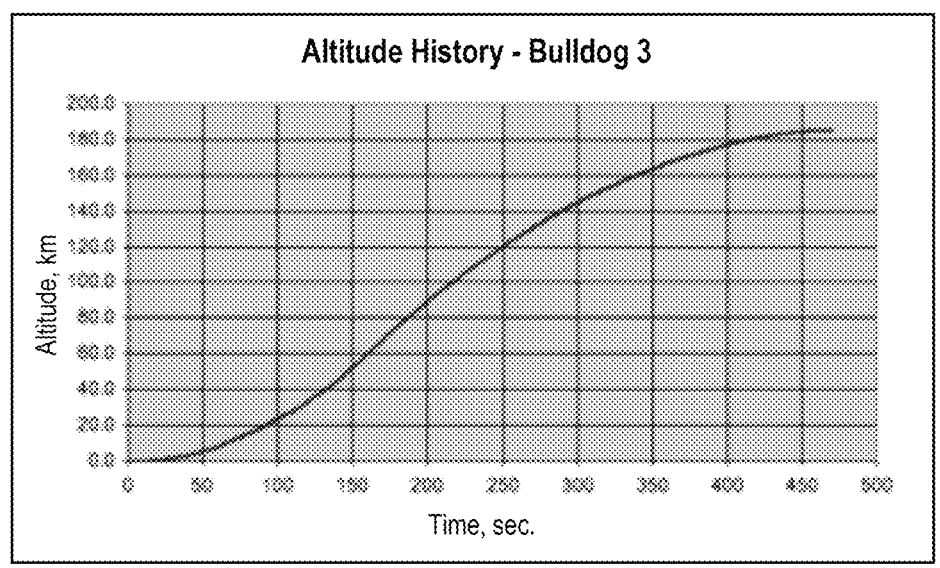
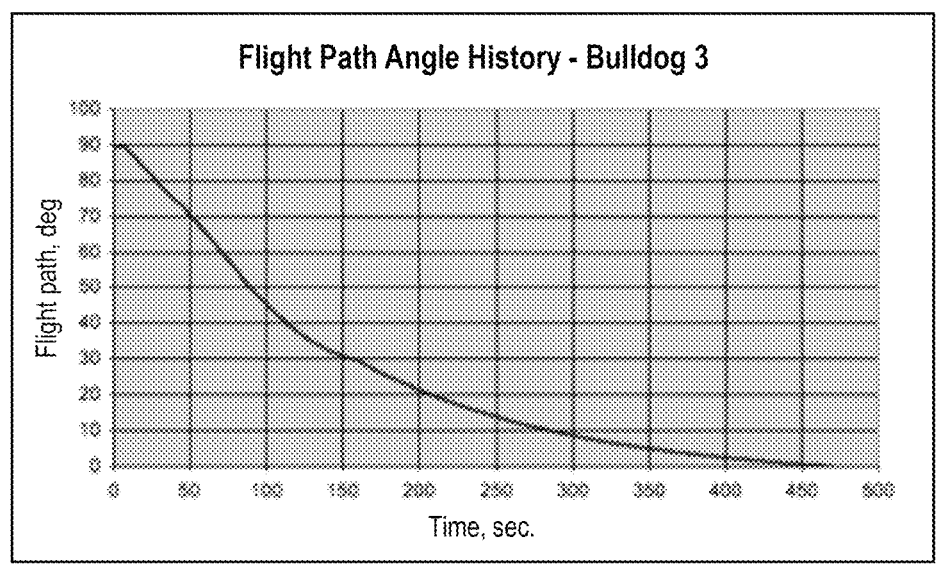

FIG 23.
*Relative Velocity and Acceleration Histories (Bulldog 3)*
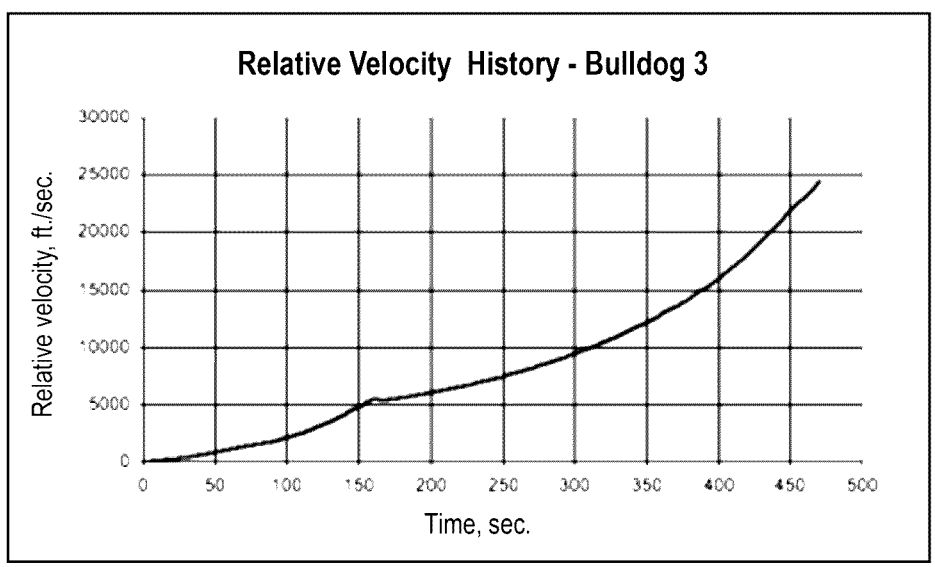
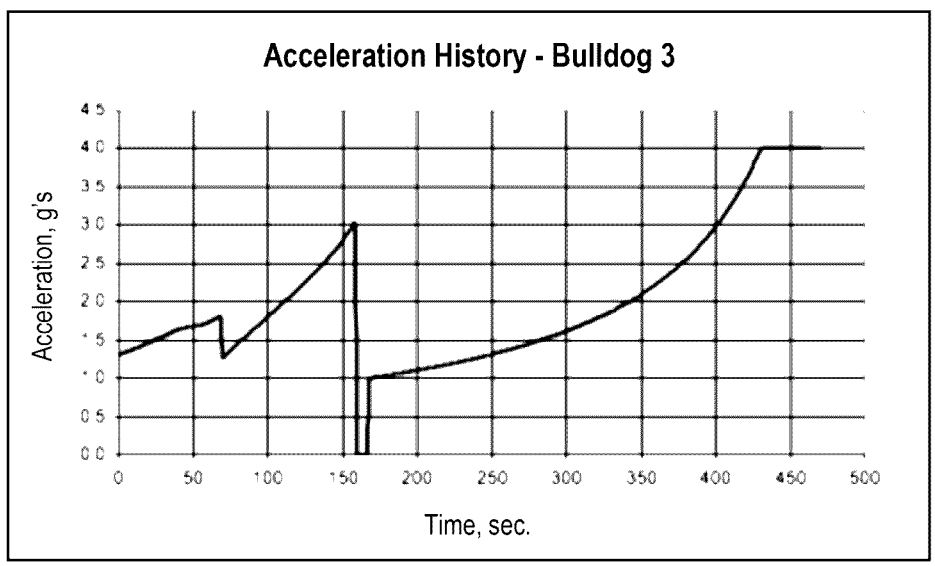

*Dynamic Pressure and Drag/Thrust Histories (Bulldog 3)*

Figure 25

Comparison of Concept Reusable Sounding Rocket Vehicles
ISAS/JAXA (Japanese-2009) vs. Bulldog SR-1
For a 100 kg suborbital payload

|  | ISAS/JAXA | Bulldog .65 | Bulldog .70 | Bulldog .75 |  |
|---|---|---|---|---|---|
| Body length | 13.5 | 3.68 | 3.68 | 3.68 | m |
| Body diameter | 3.0 | 4.21 | 4.21 | 4.21 | m |
| Planform area | 7.07 | 13.92 | 13.92 | 13.92 | sq m |
| Take-off mass | 10,750 | 10,750 | 10,750 | 10,750 | kg |
| Dry mass | 3,814 | 3,768 | 3,230 | 2,691 | kg |
| Engine thrust | 16,723 | 16,723 | 16,723 | 16,723 | mt |
| Engine Isp | 320 | 320 | 320 | 320 | sec |
| pmf | 0.645 | 0.650 | 0.700 | 0.750 |  |
| Engine burn time | 132.74 | 133.92 | 144.22 | 154.52 | sec |
| Max altitude | 118.3 | 64.2 | 106.1 | 181.4 | km |
| Max dyn pressure | 359 | 268 | 268 | 268 | psf |
| Max g (ascent) | 4.13 | 3.53 | 4.59 | 5.81 |  |
| Micrograv @10-3 g | 180 | 45 | 124 | 279 | sec |
| Micrograv @10-4 g | 117 | 17 | 89 | 259 | sec |
| Micrograv @10-5 g | 82 | 0 | 55 | 239 | sec |

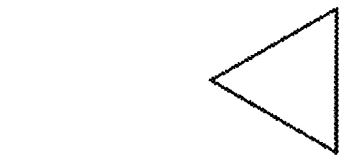

Bulldog

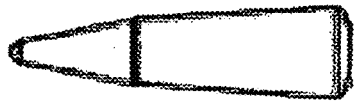

ISAS/JAXA

SPACE LAUNCH APPARATUS

CROSS-REFERENCE TO RELATED APPLICATIONS

Not Applicable

STATEMENT RELATED TO FEDERALLY SPONSORED RESEARCH OR DEVELOPMENT

Not Applicable

BACKGROUND OF THE INVENTION

1. Field of Invention

The present invention relates generally to space launch vehicles that use rocket engines to move payloads from the surface of the Earth to a desired orbit or trajectory. The present invention is also useful in the art of suborbital sounding rockets. More specifically, the present invention is a launch apparatus that utilizes a space frame truss structure to transfer propulsive loads to the payload and to simultaneously distribute vibration loads over the truss structure of the space frame of the launch vehicle and to further distribute these vibration loads to the space frame's truss structure's connecting nodes.

Another purpose of the present invention is to provide a space launch apparatus whose load bearing members form a triangular pyramid whose structural geometry distribute force applied to any part of its structure throughout its entire structure and all of its structural members and connecting nodes to allow the apparatus to withstand loads caused by resonance between the vibration spectra produced by operation of its rocket engines and the resonant frequencies of its structure.

The present invention also has the purpose of providing a space launch apparatus that has a plurality of modular space frame truss structures that can be prefabricated, moved to the launch site as a kit of parts and then the majority of the space launch apparatus can be assembled at the launch site from these parts.

Yet a further purpose of the present invention is to provide a launch apparatus whose structural integrity is maintained by a space frame comprised of truss structures whose elements include a plurality of compression members and tension members including tension members that are flexible cables, whereby said space frame is structurally robust, inexpensive to manufacture and easy to construct.

2. Background

All currently operating space launch apparatus use rocket motors as reaction engines that create thrust by expelling mass. Chemical rockets create thrust by reacting propellants within a combustion chamber pressure vessel to produce hot gas at high pressure. This hot gas is accelerated by being compressed passing through a venturi and then expanding through a bell or aerospike nozzle. Space Launch apparatus' are usually multistage and have a diameter to height ratio of greater than 1 to 10. These multi stage apparatus' sometimes fail due to vibration and accelerated loads acting on their structure; especially they are susceptible to failure at the separation planes between stages of vehicle in a multistage vehicle. An example of such a space launch apparatus is the Saturn five rocket built by NASA for the Apollo program. The Saturn five has a height to width aspect ratio of approximately 1 to 10. It is the largest rocket ever flown being about 110 m long and about 10 m in diameter. All space launch vehicles share the Saturn five's geometric form, i.e. a plurality of relatively skinny cylinders stacked on top of each other. A multistage rocket comprising a plurality of stacked cylinders must balance all of the rocket stage cylinders on top of each other during its operation. The interface planes between these rocket stages must withstand the vehicle's vibration and acceleration loads without structural failure. Complex coupled loads analysis is required to verify that these interfaces between the rocket stages and between the rocket stages and the payload are capable of withstanding the heavy vibration and acceleration loads. This analysis is a critical part of the flight qualification. For large multistage launch vehicles carrying heavy payloads, these mechanical loads must be managed with great precision for the rocket to operate without failure. Put simply, current launch vehicles are very delicate structures.

In the 1960s and 1970s American aerospace companies proposed to design and construct much larger launch vehicles. Because the inventor cannot build and test a working model of the present invention, some information about these carefully engineered large vehicles should be useful as background to show that the present invention is technically credible and reasonable.

Chrysler's single stage earth orbital reusable vehicle (SERV); a NASA 1971 phase A space shuttle study, proposed a rocket that was 96 feet wide and the 101 feet tall to carry over 50 tons to low Earth orbit (LEO) using a single reusable rocket stage. SERV proposed to use this aspect ratio of height to diameter because it returned from orbit like a gigantic Apollo capsule. SERV was proposed to be powered by a 32 Mega Newton aerospike rocket motor. A ground test version of part of this rocket engine was designed, built and ground tested by the Rocketdyne Corporation. The entire SERV was to launch, fly to orbit, release its payload and then reenter the atmosphere like an Apollo capsule and land vertically using turbojet engines. [Final report of NASA Contract NAS8-26341]

Aerojet Corporation proposed the Sea Dragon; a 1963 design study for a fully reusable two-stage rocket that would launch 508 metric tons to low earth orbit. This rocket was 150 m long by 23 m in diameter. It would have been built at a shipyard and then towed out to sea to be launched. Launching from the ocean was considered beneficial because it requires fewer support systems. The rocket was to be made of 8 mm steel sheeting. Aerojet technically validated all aspects of the Sea Dragon proposal including conducting multiple trial launches of smaller rockets from the ocean. These ocean test launches were not conducted from ships. The rocket was to be submerged in the ocean and launched from the water. The Sea Dragon was designed by Robert Truax, who also designed the US Navy's Polaris missile to be fired from a submerged nuclear submarine. Aerojet concluded that a sea launch could reduce the launch site costs by up to 95%. The Sea Dragon vehicle had two stages. The first stage was to be powered by a single 360 Mega Newton rocket motor burning RP-1 and liquid oxygen at 17 atm pressure. This engine was pressure fed. For comparison, the space shuttle's liquid fueled main engine cluster produces 5.7 Mega Newton of thrust. The most powerful liquid fueled engine ever built, the Russian RD-170, produces 7.9 Mega Newton of thrust and the solid rocket boosters used by the American space shuttle, which are the largest solid fuel rockets yet built, produce 14 Mega Newton of thrust each. [Final Report, NASA contract NAS8-2599 summary]

A BRIEF SUMMARY OF THE INVENTION

Structure and Function

A space launch apparatus comprising a solid triangular space frame constructed of a plurality of connected truss members that are attached to each other at nodes and are also attached to at least one rocket motor and to at least one payload whereby the force produced by the operation of the rocket motor is transferred to the payload and aerodynamic and vibration loads are distributed through the truss members and their nodes.

The present invention is a space launch apparatus comprising a triangular space frame truss structure for transmitting acceleration loads to a payload while at the same time distributing vibration loads across the truss structure and its intersection nodes. The truss structure of the present invention may have elements in both compression and in tension. In one embodiment of the present invention the load carrying structure of the apparatus is a triangular space frame comprising a plurality of equilateral triangular truss members structurally and functionally connected to the rocket motors, guidance equipment, stage separation equipment, stage interface structures, payload separation and interface structures and apparatus and aerodynamic fairings by fastening means capable of withstanding the vibration and acceleration loads produced during the operation of the rocket motors. The triangular structure of this embodiment of the present invention comprises truss members braced or cross braced either in compression or in tension by additional truss members or cables. The truss members and other elements of the present invention may be connected by any means capable of carrying the mechanical loads generated by the invention's operation. These affixing means would include, by means of example only and not by way of limitation, bolting, welding, adhesive attachment, or construction by 3-D printers as a single structure. The apparatus taught by the present invention may use any form of a rocket engine; for example multi-propellant liquid rocket engine, solid rocket engine, bell rocket engine, aerospike rocket engines or hybrid rocket engines. The structure of the present invention may be constructed of any material having strength and mechanical characteristics that can withstand its operating loads without failure; for example steel, titanium, composite materials including carbon-carbon composite and carbon nanotube reinforced materials. Throughout this specification specific examples are given to show different embodiments of the invention. These specific embodiments are illustrational and are not intended to limit the scope of the invention.

The present invention is limited only by the appended claims and their equivalent. The inventor believes that the present invention can be constructed using material that can be worked outside of the aerospace industry; specifically in a commercial or naval shipyard. The space frame structures used by the present invention may be constructed in modular sections in a factory or shipyard and then shipped as a "kit of parts" to the launch site where the launch apparatus may be assembled and integrated together with all of its constituent systems, such as rocket engines, recovery systems, control and guidance apparatus, and any other subsystem required for its operation as a space launch apparatus. The inventor believes that this aspect of the present invention makes it suitable for the construction of extremely large launch vehicle apparatus, which would be very difficult or impossible to build without using the present invention.

The present invention may use liquid fueled multi-propellant rocket engines, solid fuel rocket engines or hybrid rocket engines.

The present invention may be operated from a fixed land launch site or it may be launched while it is partially submerged in a lake or ocean.

All or part of the present invention may be reused; either by recovering the stages or their structural elements, i.e. part or all of the apparatus; or by using the upper stage of the apparatus in orbit as a orbital habitat, orbital storage facility or as a part of an interplanetary spacecraft; it is the intent of the inventor to provide a reusable apparatus for space launch and operations all parts of which are capable of being used beneficially multiple times or for multiple purposes.

BRIEF DESCRIPTION OF THE SEVERAL VIEWS OF THE DRAWINGS

FIG. 3 is an exploded orthogonal view of the first stage, second stage and payload carrier of a space launch apparatus constructed according to the present invention.

FIGS. 10 to 24 present the graphical results of a theoretical mathematical model of the ascent flight performance of the present invention at several scales. (The present invention is called the "Bulldog" launch vehicle in this analysis.) The ascent flight performance was evaluated using the 3D version of POST (Program to Optimize Simulated Trajectories), a standard program for such analysis. The POST analysis was performed by Dr. Ted Talay, head of the Vehicle Analysis Branch at NASA Langley Research Center (retired), who has skill in the art of launch vehicle systems.

FIG. 10 is a graph showing the propellant mass fraction for ballistic launch vehicles that are reusable.

FIG. 11 shows how the triangular profile of the present invention was approximated by circular plan form to provide a reference area for the ascent flight performance model.

FIG. 12 is a graph showing the assumed drag coefficients of the present invention.

FIG. 13 is a table showing the mass properties for several scaled embodiments of the present invention. The mass properties shown in this table include height, diameter, gross liftoff weight, first and second stage mass estimates and payload estimate for the bulldog launch vehicle embodiments that are equivalent to the Zenit launch vehicle, the Saturn five launch vehicle and the Sea Dragon launch vehicle.

FIG. 14 shows the POST trajectory events for the three scaled bulldog vehicles these characteristics were given in FIG. 13.

FIG. 15 is a graph illustrating the relationship between the gross mass of the present invention and the payload mass the present invention can carry to Earth orbit for the embodiments of the present invention that are equivalent to the Zenit, Saturn five and Sea Dragon launch vehicles.

FIG. 16 shows graphs of the altitude and flight path angle histories for the Bulldog 1, which is the embodiment of the present invention that is roughly equivalent to the Ukrainian Zenit launch vehicle.

FIG. 17 shows graphs of the relative velocity and acceleration history for the Bulldog 1.

FIG. 18 shows graphs of the dynamic pressure load and the drag/thrust histories for the Bulldog 1.

FIG. 19 shows graphs of the altitude and flight path angle histories for the Bulldog 2, which is the embodiment of the present invention that is roughly equivalent to the American Saturn five launch vehicle.

FIG. 20 shows graphs of the relative velocity and acceleration history for the Bulldog 2.

FIG. 21 shows graphs of the dynamic pressure load and the drag/thrust histories for the Bulldog 2.

FIG. 22 shows graphs of the altitude and flight path angle histories for the Bulldog 3, which is the embodiment of the present invention that is roughly equivalent to the proposed Sea Dragon launch vehicle.

FIG. 23 shows graphs of the relative velocity and acceleration history for the Bulldog 3.

FIG. 24 shows graphs of the dynamic pressure load and the drag/thrust histories for the Bulldog 3.

FIG. 25 is a geometric sketch and table of comparisons for an embodiment of the present invention at the scale of a reusable suborbital sounding rocket vehicles; comparing the suborbital embodiment of the present invention, called Bulldog SR-1 with the ISAS/JAXA (Japanese-2009) suborbital sounding rocket, each having a 100 kg suborbital payload. The table shows the calculated characteristics of the suborbital embodiment of the present invention that has payload mass fractions of 0.65, 0.70 and 0.75.

DETAILED DESCRIPTION OF THE INVENTION

Figure 1A:
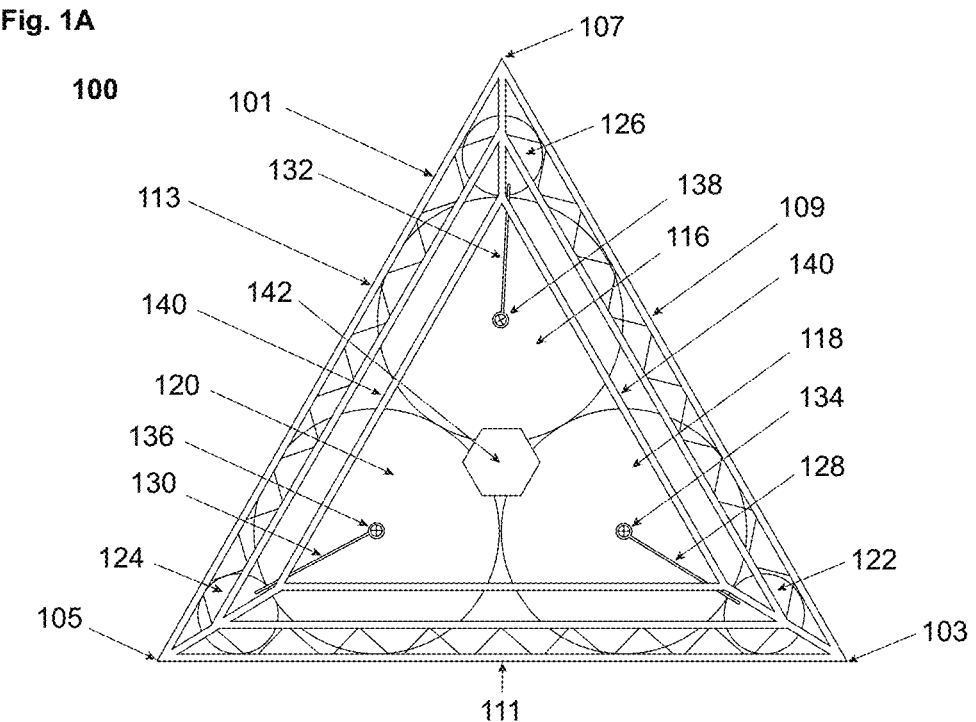
FIG. 1A is a top view of the first stage of a space launch apparatus constructed according to the present invention.

FIG. 1A is a top view of the one embodiment of the first stage 100 of a space launch apparatus constructed according to the teachings of the present invention. In FIG. 1A, triangular space frame 101 has vertices 103, 105 and 107. By the term "space frame" the inventor means a truss like, lightweight rigid structure constructed from interlocking struts in a geometric pattern. Space frames are normally used to span large areas with few interior supports. Like a truss, a space frame is strong because of the inherent rigidity of the triangle; flexing loads (having bending moments) are transmitted as tension and compression loads along the length of each strut. The relative movement of the space frames structural elements due to vibration or acceleration loads are transmitted to all the vertices of the space frame. In space frame 101, truss member 109 is connected to truss members 113 and 111 by vertices 107 and 103, respectively. The connection between these truss members may be done by welding, bolting, riveting, adhesive bonding, or by any combination of these attachment means that connect the truss members together mechanically such that the joint formed by their connection is capable of bearing the mechanical loads produced during the invention's operation. Truss member 113 is mechanically attached at vertex 105 to truss member 111. In FIG. 1A, truss members 109, 111 and 113 are a triangular truss structures. Vertexes 103, 105 and 107 are the nodes of the said truck structures. The triangle comprising the above said truss members and vertexes is an equilateral triangle. Each of the sides of the three sided equilateral pyramid that is the basic structure of the present invention is adapted from this geometric form. This form of the present invention is shown for illustration and is not intended to limit the scope of the invention as a person skilled in the art can use the basic elements of the triangular structure of the present invention in ways that depart from an equilateral triangle. Only the appended claims and their equivalents define the present invention.

Within the space frame triangle defined by the present invention are spherical rocket motors 116, 118 and 120. These rocket motors are close packed and tangent to one another and tangent to the interior of triangular space frame 101. Spherical propellant component tanks 122, 124 and 126 are disposed tangent to rocket motors 118, 120 and 116, respectively and are also tangent to the interior truss elements of space frame 101. The said rocket motors and they said propellant component tanks are shown as spheres. The present invention may use any solid, liquid, or hybrid rocket motor that can be contained in the interior volume of the space frame 101 of the present invention. The spherical tanks shown in FIG. 1A are illustrative of one embodiment of the present invention and should not be read as limiting the scope of the present invention. In the embodiment of the present invention shown in FIG. 1A, the interior of propellant tank 122, is connected in fluid communication with propellant transfer line 128. The valve 134 is in fluid communication with the interior of the rocket motor 118. Similarly the interior of propellant tank 124 is in fluid communication through propellant line 130 with control valve 136, which is in fluid communication with the interior of rocket motor 120; and propellant tank 126 is in fluid communication through propellant line 132 with control valve 138 which is in fluid communication with the interior of rocket motor 116. By controlling the thrust produced by rocket motors 116, 118 and 120, this embodiment of the present invention can provide steering control to the launch vehicle without the need for reaction control system thrusters. It should be understood that the present invention may use any rocket motor and may use separate reaction control thrusters. The top 140 of the truss members forming the triangular sides of space frame 101 defines the top of the first stage of the present invention. Rocket motors 116, 118 and 120 and propellant tanks 122, 124 and 126; are affixed to space frame 101 by welding, bolting, riveting, adhesive, or any other method of mechanical attachment that have sufficient strength to carry loads produced by the operation of the rocket motors and that will permit the vibrational and acceleration loads and forces produced by the rocket engine during the rocket engine's operation to be transmitted to the space frame. Said rocket engines may be attached one to the other at their point of tangent through a secondary structure 142. The engineering details of the placement, structure, and connection of the rocket motors to the structure of the space frame of the present invention will depend in detail on the type of rocket engines used by different embodiments of the present invention.

Figure 1B:
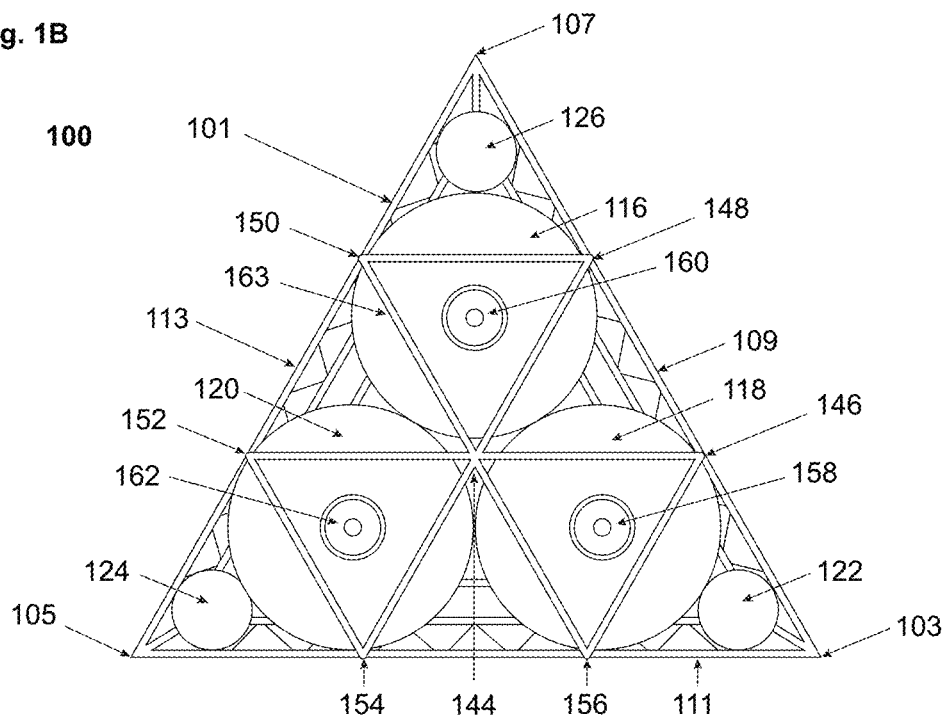
FIG. 1B is a bottom view of the first stage of a space launch apparatus constructed according to the present invention.

FIG. 1B shows the bottom view of the embodiment of the present invention illustrated in FIG. 1A. In FIG. 1B similar structures have similar numbers to FIG. 1A. In FIG. 1B, a reinforcing structure 163 in the form of three equilateral triangles are connected together at their common vertex 144 and to the space frame 101 at points 146, 148, 150, 152, 154 and 156. In FIG. 1B rocket nozzles 158, 160 and 162 are shown at the bottom center of the spheres comprising rocket motors 118, 116 and 120, respectively. The points of attachment between structure 163 and space frame 101 may be connected by the conventional means described FIG. 1A, above. Alternatively, these attachment means may be pyrotechnic fasteners capable of controllably fragmenting the frame so that it can be controllably separated from space frame 101. Likewise, the connections between said rocket motors and said space frame may be pyrotechnic fasteners capable of controllably fragmenting so the rocket motors can be controllably separated from the interior of space frame 101. The purpose for reciting this embodiment of the present invention is to teach that in an abort situation, emergency or during reentry of the first stage after its operation is finished, the rocket motors may, as a design choice for the particular mission, be separated from the space frame so that they return to earth as separate objects.

For convenience of illustration, the first stage of the embodiment of the present invention shown in FIGS. 1A and 1B are shown without aerodynamic fairings. The first stage may employ aerodynamic fairings that are fixedly or removably attached to the outside of space frame 101. The purpose of such fairings is to lower aerodynamic drag in the lower atmosphere. Depending on the specific mission ascent profile, the fairings may be retained after separation of the first stage or if the first stage operates to an altitude where it would be beneficial to eject the fairings from the present invention in order to reduce the weight of the first stage, then the fairings, like a payload fairing for a satellite, may be controllably ejected. The inventor considers the provision of removable fairings in the first stage of the present invention to be a useful improvement.

Figure 2A:
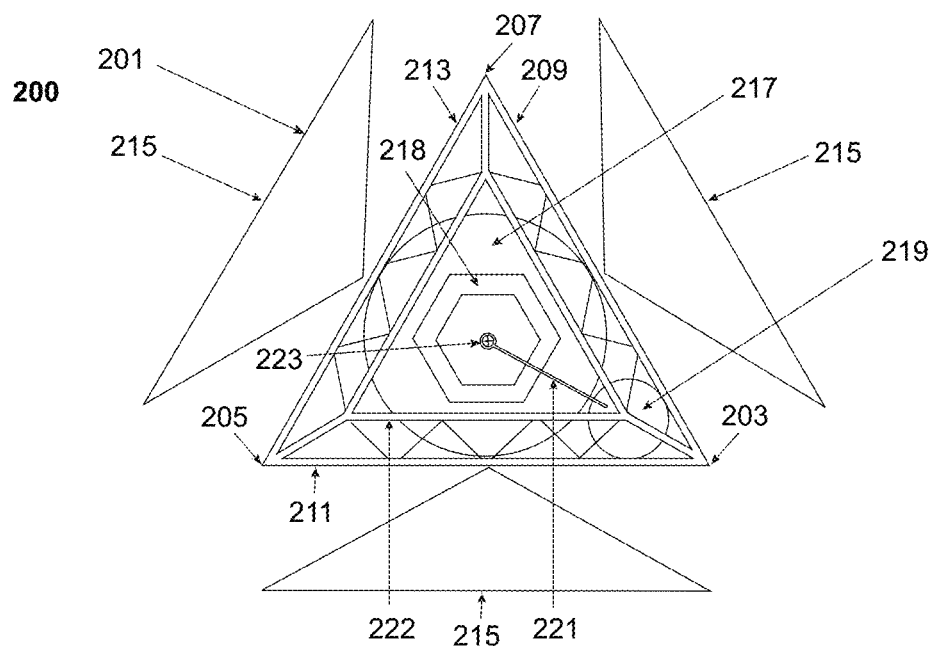
FIG. 2A is a top view of the second stage of a space launch apparatus constructed according to the present invention.
Figure 2B:
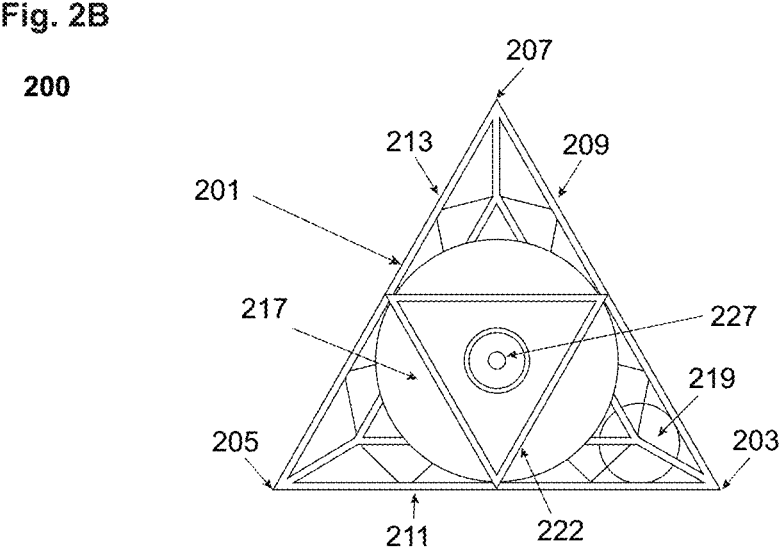
FIG. 2B is a bottom view of the second stage of the space launch apparatus constructed according to the present invention.

FIG. 2A shows a top view, looking down, on the second stage 200 of an embodiment of the present invention. Triangular space frame 201 has vertices 203, 205 and 207; and sides 209, 211 and 213. Like the space frame of the first stage of the present invention illustrated in FIGS. 1A and 1B; the space frame of the second stage of the present invention illustrated in FIGS. 2A and 2B comprise triangular truss members that defined as equilateral triangle where vertices of the triangle are the nodes of the space frame. The bottom of triangular second stage space frame 201 is attached to the top 140 of first stage space frame 101 with pyrotechnic fasteners that are controllably frangible, not shown, whereby the first and second stage of this embodiment of the present invention may be controllably separated during the launch of the invention. This separation would normally occur when the fuel for the first stage is exhausted in order to separate the weight of the first stage from the second stage. This will be described in more detail below in the description of the operation of the present invention. This type of staging is well known to those skilled in the art of the construction and operation of space launch vehicles. The top 222 of space frame side 209 is connected to the payload interface and fairing of the present invention. A support structure 218 is shown as a structural hexagon on the top of spherical rocket motor 217. Structure 218 will support the payload carrier by adapting the curved surface of the rocket engine sphere to the flat bottom of the payload carrier. The design of the specific structural support at the payload carrier is deemed to be within the skill of the art of an ordinary aerospace engineer who knows the prior art of space launch apparatus.

In FIG. 2A fairings 215 are adjacent to the space frame 201 of the second stage. The second stage 200 and payload comprise an equilateral pyramid in the embodiment of the present invention illustrated in FIGS. 2A and 2B. Fairings 215 are shown as separate from the equilateral three sided pyramid structure of the second stage for the purpose of clarity in the illustration. In the second stage illustrated in FIG. 2A, a single rocket engine 217 is shown tangent and connected to all sides of the space frame 201. A spherical propellant tank 219 is tangent to spherical rocket motor 217 and also tangent to two sides of space frame 201. Rocket engine 217 and propellant tank 219 are connected to the space frame 201 by connection means for transmitting the vibration and acceleration loads generated during the rocket engine's operation, as was described in connection with the rocket motors in FIG. 1A. The interior of propellant tank 219 is in fluid communication with propellant line 221, which, in turn is in fluid communication with controllable flow valve 223, which is in fluid communication with the interior of rocket motor 217.

The truss structures of the present invention may be made of steel, aluminum, carbon-carbon composition, titanium, or any combination of materials that are capable of withstanding the acceleration and vibrational loads produced by the combined action of the rocket motors and the structure of the present invention during its operation as a space launch apparatus. It is generally desirable to use the most cost-effective and lowest weight material capable of performing the function of the truss structure. The truss members of the space frame of the present invention may be cylinders or they may be themselves triangular, square or of other geometry. Triangular truss members and space frames have been shown in this embodiment of the present invention to illustrate the invention and not limit scope, which should be limited only by the appended claims and their legal equivalents. Likewise, the rocket engines and attachment means between the truss structures and the rocket engines are considered to be within the alternatives that may be selected by a person skilled in the art to make best use of the present invention as an apparatus and a method to accomplish its intended purpose as a space launch apparatus.

FIG. 3 is an isometric exploded drawing showing the embodiment of the present invention illustrated in the figures above. In FIG. 3 similar structures that are illustrated in FIGS. 1A, 1B, 2A and 2B have similar numbers.

In FIG. 3 first stage space frame 101 contains the three rocket engines. The upper edge 140 of the space frame truss structure of the first stage 101 is the same size as the bottom edge of the space frame truss structure of the second stage 201 having sides 209, 211 and 213. The stages of the present invention may be controllably separable. They can be connected by pyrotechnic separation means well known in the art of launch vehicle constructions for controllably allowing the stages to be separate during the launch of the present invention at a desired time. Although a two-stage embodiment is shown in FIG. 3, the present invention is not limited to two stages. A third or fourth stage could be added in the same manner as described above. However, the purpose of clarity, a two-stage embodiment of the invention intended to operate to low earth orbit is illustrated in the specification.

In FIG. 3 the top edge 222 of the second stage truss structure space frame is the same size as the bottom 301 of payload carrier 302, which is triangular and has aerodynamic triangular fairings 305, which are illustrated as they are being separated from the payload carrier. It should be understood, that both the second stage 200 and the first stage 100 of the present invention also will have aerodynamic fairings. All of the aerodynamic fairings of the present invention will be attached to the space frame of the present invention by pyrotechnic devices are fairings which may be selectively and controllably separated from the space frame of the present invention. This practice of separating a fairing is routinely used in launch vehicles taught by the prior art with regard to the payload carrier, but the inventor does not know of any case where the first and second stage of the vehicle have aerodynamic fairings that can be selectively separated from the launch vehicle.

Within payload carrier 302, a payload 307 is affixed to the payload carrier by a holding fixture 309. Insert A of FIG. 3 shows truss structure element 311. The purpose of this illustration is to show that the elements of the truss structure of the present invention may themselves be triangular structures, beams, or even separate truss structures if the launch apparatus is large enough. The truss elements 311 are connected together by tension members 313. To better distribute loads across the truss structure of the space frame of the present invention. The bottom 301 of the payload carrier is the same size is the top of the second stage space frame 222. The payload carrier may be connected to the second stage by pyrotechnic devices that are well known in the art to allow the separation of the payload from the second stage. Alternatively, the payload may remain attached to the second stage in orbit; it being noted that the second stage must go to orbit in order to release the payload in orbit. The second stage is a space frame and a sphere that may be usable as structural members in constructing space habitats and deep space vehicles.

All of the structural elements of the truss structure of the space frames taught by the present invention may be modular. By that the inventor means that the launch vehicles space frame structure can be shipped to the launch site as individual structural elements and then assembled by connecting the nodes of the truss structures of the space frames and bracing them in tension using tensioning members 313, which may be flexible cables made of braided steel using materials such as carbon-carbon compensates. The embodiment of the present invention illustrated in this specification makes extensive use of equilateral triangles as truss structures and space frames because the equilateral triangle is the best geometric form to distributing the forces acting on the apparatus of the present invention; including aerodynamic forces, vibration forces and rocket acceleration forces across all of the nodes of the truss structure and the space frames of the present invention during launch to outer space. The use of tensioning means between the truss structure elements further increases the strength and distributes the forces acting on the structure of the present invention.

Figure 4A:
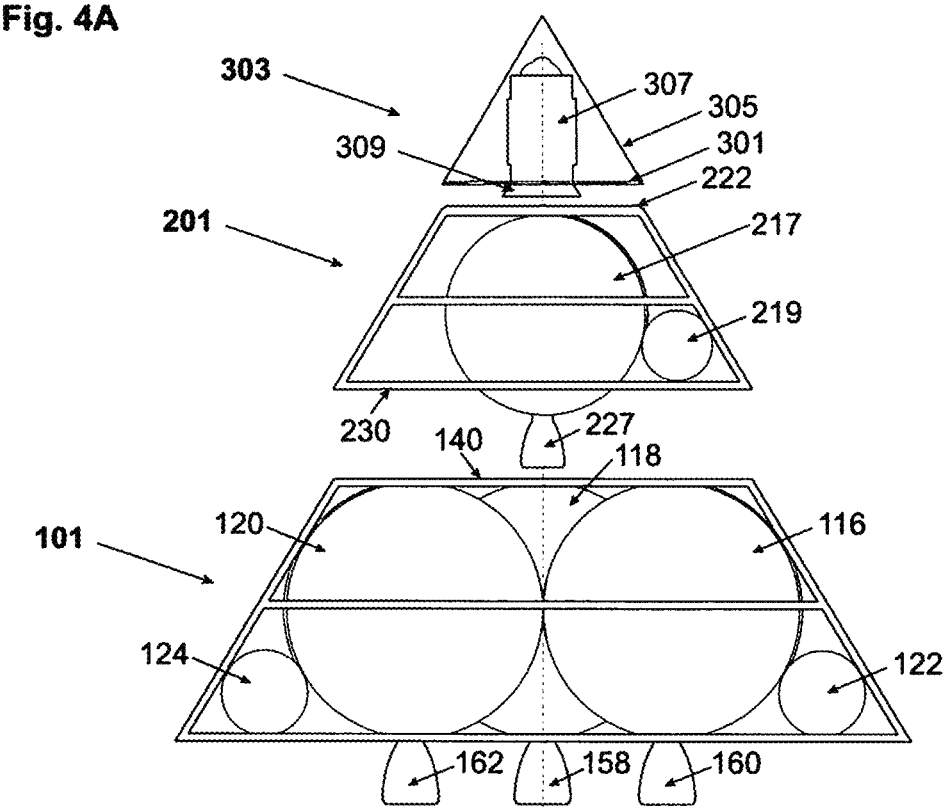
FIG. 4A is a side view of a space launch apparatus constructed according to the teachings of the present invention showing the stages separated for clarity and to illustrate the separation plane interface between the first and second stage and the second stage and the payload. It should be understood that the second stage accompanies the payload into low earth orbit and need not be separated from the payload if the empty second stage could be reused for some beneficial purpose.
Figure 4B:
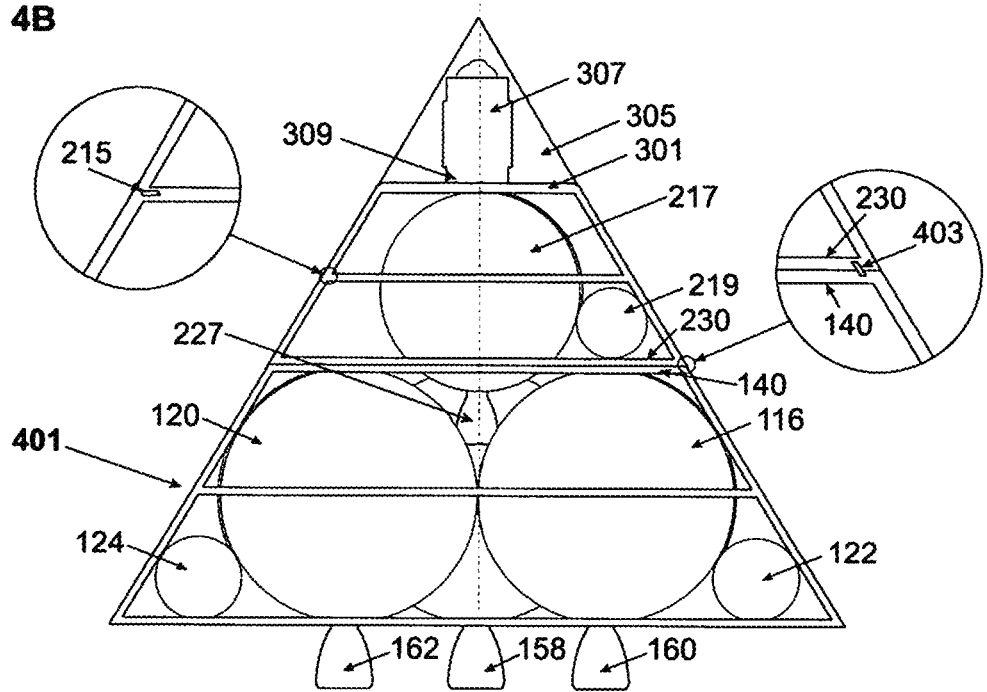
FIG. 4B is a side view of a space launch apparatus constructed according to the teachings of the present invention that illustrates how the stages and payload carrier fit together geometrically. This drawing omits the secondary tension or compression reinforcement structures.

FIG. 4A shows a side view of the space launch apparatus taught by the present invention and its two-stage embodiment, as described above. In FIG. 4A, similar structures have similar numbers to the figures above. The purpose of this figure is to clarify how the two rocket stages and the payload carrier of the present invention geometrically fit together; to give a general view of the aspect ratio, i.e. the base diameter to height of the present invention. The aspect ratio of prior art launch vehicles is between 8 to 1 and 10 to 1. The inventor recognizes that the aspect ratio and shape of the present invention will result in more aerodynamic drag than a prior art launch vehicle. However, this aerodynamic drag is only present in the lower part of the atmosphere where the air density is high. The present invention is much more efficient at containing fuel and will carry enough fuel to overcome atmospheric drag in the lower atmosphere. This may, require that the launch ascent profile used by the present invention be optimized to move through the dense atmosphere until it is practical to jettison the aerodynamic fairings from the launch vehicle stages and payload. It should be noted that 99% of the earth's atmosphere is below 32 kilometers which is only about 20 miles. The present invention's launch profile may also be adjusted to traverse this lower portion of the atmosphere at a lower velocity than current launch vehicles, which will, require more fuel. The present invention may contain a large amount of fuel within its space frame structure. This benefit is possible because of the use of the space frame and truss structures of the present invention and is a result of the novel geometry of the space launch apparatus taught by the present invention.

FIG. 5 shows a rocket motor for use with the present invention. This rocket motor will be the subject of a co-pending patent application filed by the same inventor. It is important to note that the present invention may be used with any type of rocket motor that is capable of fitting within the space frame of the present invention and providing sufficient total change in velocity to the present invention so as to allow the present invention to overcome aerodynamic drag and the force of gravity sufficiently to move a payload on a suborbital trajectory to a desired suborbital landing site, to the altitude and velocity to place the payload in a desired earth orbit or to a velocity and direction sufficient place the payload on a desired escape trajectory. Although any type of rocket engine may be used as part of the present invention, the inventor believes that synergistic benefits could result from using the present invention with the inventors co-pending invention in the art of rocket motors. Therefore, in order to disclose the best embodiment of the present invention known to the inventor at the time this patent application is filed, the inventor will describe the rocket motor taught by the co-pending application so said engine can be shown as part of the embodiment of the present invention disclosed by this specification.

There are many types of rocket motors. Among these types, chemical rocket motors a commonly used in launch vehicles. Chemical rocket motors are reaction engines wherein a chemical reaction liberates energy and generates a hot gas. Examples of chemical rocket propellants are shown in Table 1 below. Different combinations of chemical rocket propellants produce different values of specific impulse and density impulse. These terms are well known to those skilled in the art of chemical rocket engines. A useful summary of information about rocket propulsion may be found in the eighth addition of the excellent survey work "Rocket Propulsion Elements" written by George P Sutton and Oscar Bablarz and published by John Wiley & Sons, Inc. in 2010. Within this reference, table 13-1 "characteristics of some operational solid propellants" should be especially noted and it is incorporated into this specification by reference.

The rocket engine taught by the co-pending patent application comprises a casing which functions as a pressure vessel, plurality of solid phase propulsion components that are nonhomogeneous in their composition layered radially from the center axis of the engine and a rocket nozzle in fluid communication with the interior of said pressure vessel. This novel rocket motor burns one composition of fuel at the beginning of its separation and another composition of fuel later in its operation. By varying the composition of the fuel layers radially the thrust force and burning time of the engine may be varied during the engine's operation. This is desirable because over 90% of the mass of the engine is its fuel components; which are rapidly consumed during operation. If the thrust level of the engine is not changed during its operation, the acceleration imparted by the engine to the launch vehicle will increase to an unacceptable level. Currently, solid rocket engines are formed with the central burning cavity being a star shape to increase the initial burning surface area of the propellants. As the propellant is burned radially from the center axis of the engine, the surface area available for burning decreases. In the case of the space shuttle solid rocket booster, which is the most powerful solid rocket ever built, the propellant has an 11 point star shape preparation in the forward motor segment and a double truncated cone preparation in each of the upper segments and after closure. This configuration provides high thrust of ignition and reduces the thrust by approximately a third by 50 seconds after liftoff to avoid over stressing the vehicle during its flight through the regime of maximum dynamic pressure.

The rocket motor taught by the co-pending application initially burns a first propellant, such as ammonium perchlorate composite propellant (APCP), which is the fuel used by the space shuttle's solid rocket boosters, for the first part of its operation and then transitions to burning a second propellant, for example gelled kerosene with ammonium chlorate oxidizer suspended and dispersed in the gel, during a second portion of the rocket motor's operation. APCP develops a specific impulse of 242 seconds at sea level or 268 seconds in a vacuum. Its main fuel is aluminum. Aluminum is used because it has a reasonable specific energy density of about 31.0 MJ per kilogram but a high-volume metric energy density and it is difficult to accidentally ignite. The rocket motor taught by the co-pending application also can vary the mixture ratio between the fuel components by burning a plurality of propellant compositions that are disposed radially so as to burn sequentially.

The rocket motor taught by the co-pending application can, by varying the mixture ratio of the fuel components, provide a few layers that have a deficit of one fuel component; usually the oxidizer. Without sufficient oxidizer, the propellant produces less energy. Additional oxidizer can be directly injected into the engine as a fluid. The amount of this additional oxidizer can be controlled to vary the operating characteristics, such as thrust of the rocket motor. A hybrid rocket motor has one fuel component and a solid phase within the pressure vessel casing of the engine and introduces a second component, usually, but not necessarily, the oxidizer, as a liquid. Such a hybrid rocket motor can be throttled and even turned off and restarted, but since all of the second fuel component must be injected, it has proved difficult to scale to large engines. This rocket motor can be operated either as a solid rocket motor or as a hybrid rocket motor. If operated as a solid rocket motor, all of both fuel components for all of the fuel layers are present within the pressure vessel casing of the motor. If operated as a hybrid motor, one of the fuel components is in deficit, and that deficit is made up by injecting a fuel component, which does not have to be the same fuel component as is present in the casing, into the engine from an external source. For example, the first layer of fuel in the engine burned could be APCP exactly as it is composed for use in the space shuttle solid rocket booster. The second layer could be a gelled hydrocarbon such as mineral oil, gasoline, kerosene or the like gelled with styrene gelling agent. This stiff Hydro Carbon gel can contain up to 75% weight percent of solids; such as an oxidizer comprising of finely dispersed ammonium perchlorate within the stiff gel. The second injected oxidizer could be concentrated hydrogen peroxide, liquid oxygen, nitrous oxide or liquid fluorine. If the propellant components have the optimal mixture ratio within the rocket motor casing, then only a small amount of additional oxidizer would have to be injected into the operating rocket engine in order to change the mixture ratio and very the engines thrust. If, however, one of the oxidizer components is in stoichiometric deficit in one or more of the propellant layers, a larger amount of external oxidizer could be introduced to both correct the mixture ratio and to control thrust that the engine. This is defined the purpose in this specification as "partially hybrid" mode of operation.

The partially hybrid non-homogeneous propellant rocket motor taught by the co-pending application results in a rocket motor whose thrust can be varied over a very wide range by the selection of fuel components layered within the motor casing and that this thrust can further be varied controllably and precisely by controlling the amount of deficit fuel component injected into the engine. If more than one rocket motor is used in a vehicle, this change in fine thrust of the engine can be used to provide a steering momentum without using moving parts, other than the control valve controlling the amount of propellant injected into the engine.

Figure 5A:
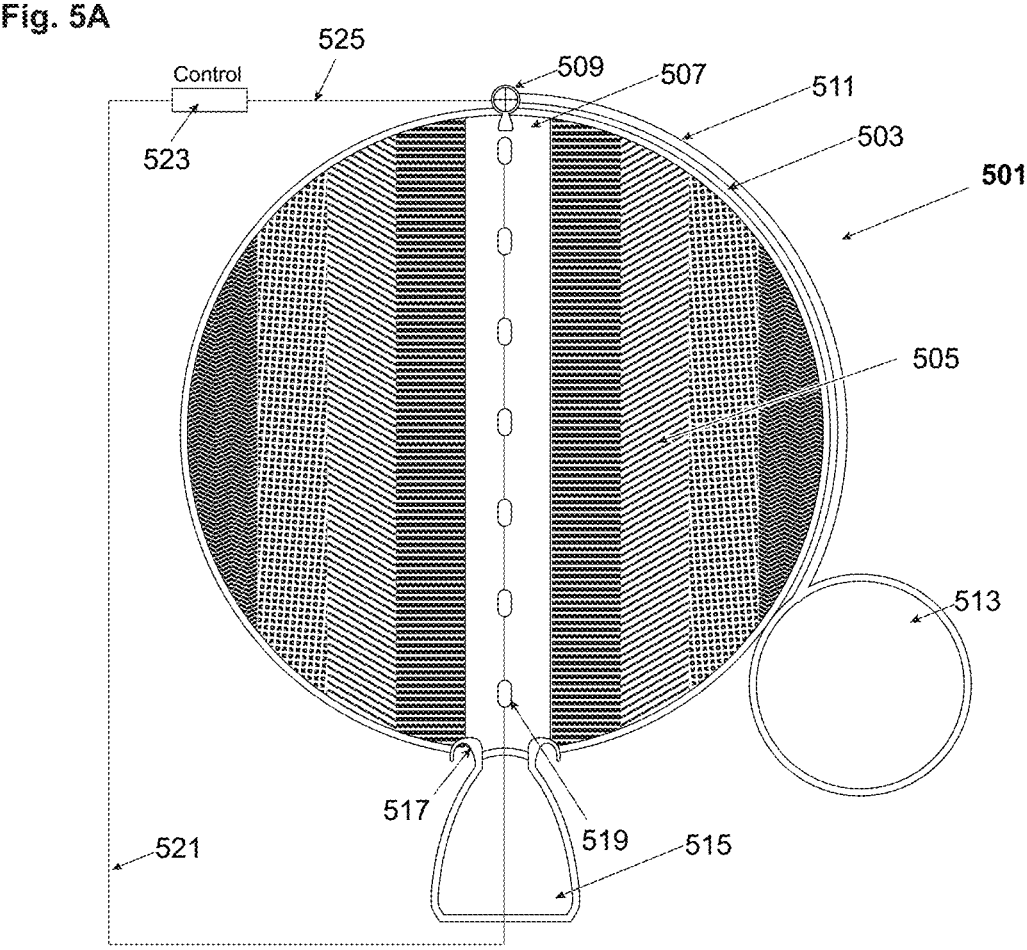
FIG. 5A is a cross-sectional diagram of a pseudo-hybrid variable chemical radial composition controlled thrust gel rocket engine that can be used with the present invention. This rocket engine is the subject of a separate patent application. It is shown for the purpose of illustrating how the present invention operates with a gel rocket engine. The present invention is not limited to this engine design, but the inventor believes that this type of engine can be beneficially used with the current invention to yield synergistic improvements in the state-of-the-art of space launch systems.

FIG. 5A shows a cross-sectional cutaway to the middle of a partially hybrid non-homogeneous propellant rocket motor. In FIG. 5, rocket motor 501 is a spherical pressure vessel 503 having an interior volume 505. Pressure vessel 503 is partially filled with propellant, indicated by the shaded region of the drawing, defining a central opening 507 that is cylindrical in cross-section and extends through the entire diameter of the spherical pressure vessel. At one end of the cylindrical open space in the rocket motor a control valve 509 places the cylindrical opening in controllable fluid communication with a propellant line 511. The opposite end of propellant line 511 is in fluid communication with a propellant tank 513. A bell rocket engine nozzle 515 is affixed to the spherical pressure vessel by fastening means 517 at the end of the cylindrical opening in the rocket motor opposite control valve 507. A plurality of pyrotechnic igniters and temperature and pressure sensors 519 are placed inside the rocket motor along the cylindrical opening and a control line 521 places the sensors in functional communication with a control system 523. The control system 523 is in functional communication through line 525 with control valve 509.

Figure 5B:
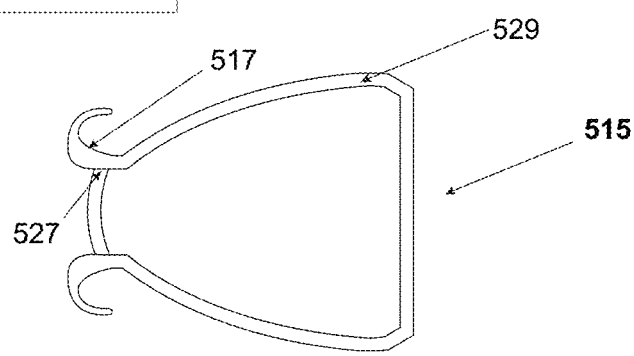
FIG. 5B is a cross sectional view of the rocket nozzle used in the rocket engine shown in FIG. 5A.

FIG. 5B shows a cross-sectional view through the bell engine nozzle 515 of rocket motor 501. In FIG. 5B attachment means 517 are shown. The engine bell has a venturi 527 and an expansion nozzle 529.

In FIG. 5A, a plurality of layers of propellant of differing compositions, represented by the different shadings of the fuel in the illustration, and generally surround the cylindrical opening that has the fluid control valve at one end and the bell engine nozzle at the other end. The annular disposition of the different compositions of fuel allow the burning rate and thrust of the engine to be varied as a function of operating time as the different annular layers of fuel are consumed.

In FIG. 5A, each of the plurality of layers of propellant of differing composition contains a plurality of components, for example fuel and oxidizer. The composition of the fuel and the composition of the oxidizer for each layer of propellant are selected to provide a desirable combination of total thrust and total burning time for each stage of the rocket motors operation. Thus the innermost layer of propellant that would burn first would be selected for very high thrust, for example APCP, as is used by the American space shuttle. This would allow the fully fueled launch vehicle to take off. Once a significant part of the fuel is been burned, it would be desirable to reduce the thrust of the rocket engine in order to control the acceleration of the launch vehicle. This could be accomplished by having the second layer of propellant having a different chemical composition that would burn with less thrust, but for a longer time, the second layer could be a gelled hydrocarbon, such as kerosene that had a suspended amount of oxidizer, such as aluminum perchlorate, suspended within the stiff gel. A hydrocarbon gel using a triblock styrene gelling agent can produce a stiff hydrocarbon gel that can carry a 0.1 to 75 weight percent solid or liquid suspended component. If the ammonium perchlorate oxidizer is in the hydrocarbon gel propellant in stoichiometric deficit, then the mixture ratio between the fuel and oxidizer in the gelled propellant will not be optimal, which will result in the propellant producing less thrust than it would if the fuel to oxidizer mixture ratio was optimal. If the fuel air ratio is sufficiently unbalanced, the propellant will burn it all. Additional oxidizer may be supplied from an external source to ferry the mixture ratio. It is important to note that this second source of oxidizer introduced from an external source need not be the same as the oxidizer in the propellant located in the rocket motor pressure vessels. It can have a different chemical composition, that the oxidizer that was gelled with fuel to make the gelled propellant. Even if the fuel oxidizer ratio is optimal for the selection combination of propellant components, as could be the case with APCP, additional oxidizer could be injected into the system as is done in a conventional hybrid engine in order to unbalance the mixture ratio so that the thrust of the engine could be varied during the operation of this "partially hybrid none homogeneous composition" rocket engine. The inventor knows of no reason why this type of rocket motor could not be scaled to any desired size, which avoids a limitation in conventional hybrid rocket motors.

The rocket motor in FIG. 5A shows four layers of propellant, each of which could be selected to control the acceleration of the launch vehicle as its fuel is expended. Since fuel makes up about 90% of the mass of a chemically powered launch vehicle, the inventor believes that this method of controlling the thrust of a solid fuel rocket motor is a useful improvement in the art of rocket engines.

Additionally, each of the layers of propellant of differing compositions contains only a portion of one of the fuel components. The component that is in deficit in the propellant composition is controllably supplied from an external tank 513 through propellant line 511 and control valve 509. The advantage of this design is that a nonstoichiometric mixture of fuel components is much less dangerous to mix and to transport because it does not easily ignite or explode. A conventional solid rocket engine contains all of the fuel components within its casing pressure vessel. This mixture of all rocket propellant components can be explosive; dangerous to transport; and difficult to safely mix and cast into the rocket motor pressure vessel. A conventional hybrid rocket engine contains all of but one fuel component in the pressure vessel of the rocket motor and introduces the entire second fuel component from an external source. One example is the use of butyl rubber as a cast fuel and nitrous oxide as oxidizer.

Into the case of the rocket engine shown in FIG. 5 the gross thrust and burning time is controlled by the selection of propellants in a plurality annularly disposed cast layers around the central core of the motor. The fine thrust control for said rocket motor is provided by controlling the amount of the fuel component that is in deficit within the pressure vessel that is introduced from an external source.

For the purpose of the present invention the benefit of this type of multi-propellant composition rocket motor is that the gross thrust of the motor's may be controlled by the annular composition of the propellant components in a plurality of layers; and the fine thrust of the rocket motor's may be controlled by modulating the amount of deficit fuel component introduced into the pressure vessel from an external source. The first benefit allows the ascent profile of the space launch apparatus taught by the present invention to be controlled so as to control the rate of acceleration of the launch vehicle during each phase of the launch. This allows the launch vehicle to move relatively slowly through the thick lower atmosphere and then to accelerate to orbit after jettisoning its first stage, second stage and payload carrier fairings. The second benefit, i.e. fine thrust control, allows the three engines to slightly vary their thrust to provide steering to the rocket without moving parts or a separate heavy RCS system. Because the fuel component inside the pressure vessel is inherently much safer than solid rocket motor fuel taught by the prior art because it has one component in deficit, the rocket motors can be filled with fuel at the launch site. By using a hydrocarbon gel, comprising a hydrocarbon such as kerosene and a gelling agent such as a diblock or triblock styrene, a substantial portion of the second fuel component can be contained within the hydrocarbon gel. As was mentioned above, the composition of the fuel components can be varied to change the thrust and burning time of the engine. Since a great many hydrocarbons having different burning characteristics are capable of being made into a gel that can contain a portion of the oxidizer for the rocket motor, the inventor believes that this invention works synergistically with the present invention. A hydrocarbon oxidizer rocket motor has a higher specific impulse than most solid fuel motors. If the fuel component is gelled kerosene and the oxidizer component is hydrogen peroxide, then the specific impulse of the fuel is roughly the same as a liquid fuel rocket engine. The Inventor also believes that the mechanical characteristics of the gel, including its stiffness, can be adjusted to selectively absorb the vibration spectra produced by the rocket motor's operation.

The rocket motor pressure vessels may be made of steel, filament wound carbon carbon composition or any other material capable of withstanding the pressure loads.

In operation, a control signal is sent from control unit 523 through actuating line 521 to a pyrotechnic igniter, which may be a NASA standard solid rocket igniter, in the igniter/sensor chain 519. At the same time, additional deficit fuel component is injected through valve 509 into the interior space 507 within the pressure vessel 503. The rocket motor ignites in the conventional way and produces high-pressure hot gas that is expelled through a nozzle 515, which is in fluid communication with the interior of the engine space 507. Nozzle 515 is preferably an ablatively cooled carbon fiber composite nozzle constructed so that it erodes as the rocket engine operates.

As rocket motor 501 operates and hot gas exits the rocket nozzle the rocket motor imparts force to the space frame of the present invention. Specific numerical examples equivalent to some historical and proposed conventional launch vehicles will be given below. As rocket motor 501 burns fuel it consumes successively the various radial layers of differing combination propellant. The burning of the different propellants controls the thrust and burn time profile of the motor to impart a desired impulse to the space launch apparatus taught by the present invention. During the operation of rocket motor 501, the control valve 509 may modulate the amount of the propellant component introduced from tank 513 through line 511 and valve 509 into the central space of the operating rocket motor. Injection of this fuel component will change the mixture ratio of the fuel components which will vary the thrust produced by this rocket motor. The change of thrust in the three motors shown in the embodiment of the present invention in the specification will allow present invention to be steered in any direction. If there is some problem, the supply of fuel component through valve 509 can be stopped and the thrust of the engine will be reduced either to zero or to a low value.

Figure 6:
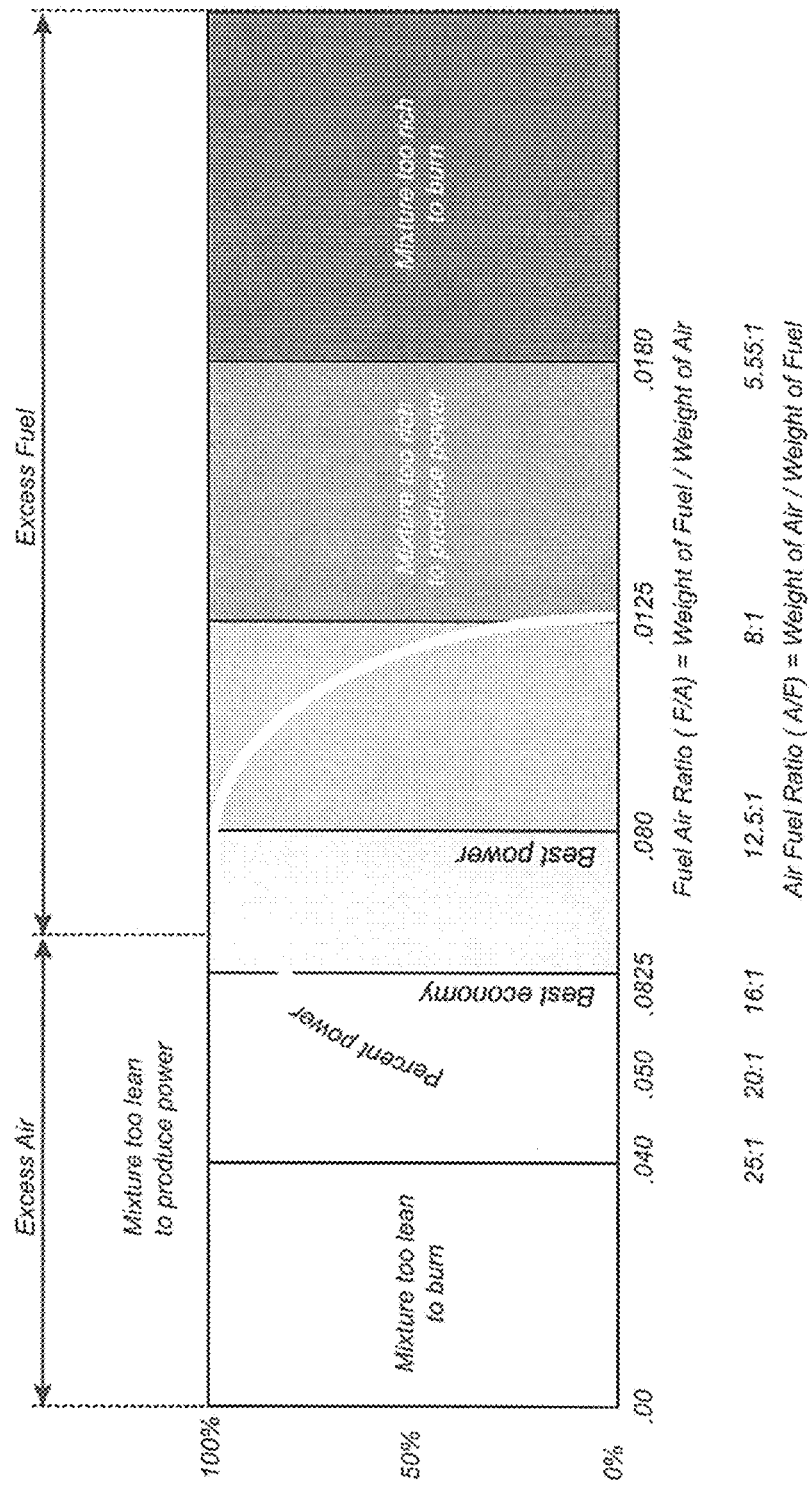
FIG. 6 is a graph illustrating engine power as a function of oxidizer to fuel ratio mixture in a rocket engine. The purpose of this figure is to illustrate the thrust control capability and mechanism of the rocket engine shown in FIG. 5A.

FIG. 6 shows the experimentally determined actual effect of varying the mixture ratio of oxidizer to fuel in burning fuel in a piston aircraft engine. Although this graph shows the mixture ratio for the burning of fuel and air in a hydrocarbon powered internal combustion engine, not a rocket engine, the physical process of burning the fuel in a cylinder is physically and chemically similar to burning a hydrocarbon fuel inside a rocket motor pressure vessel, therefore this experimental results should be instructive and useful as an analogy; until experimental results can be obtained from the operation of the gelled hydrocarbon fuel with suspended oxidizer in the gel within a rocket engine. It should be noted that there is a point on this graph where even though fuel and oxidizer are present, no power is generated because the mixture is either too lean or too rich to burn. Within the range of ratios of fuel and oxidizer where burning will occur this curve indicates that the difference between zero power and 100% power requires only a small change in the mixture ratio. It will be necessary to determine experimentally what the best ratio of fuel components is for each fuel oxidizer composition, but this information in FIG. 6 clearly shows that the power of the burning fuel oxidizer mixture can be varied greatly with only is relatively small change in mixture ratio. If ammonium perchlorate is used as the finely divided suspended oxidizer held within the gelled hydrocarbon propellant, it must be noted that ammonium perchlorate is capable of explosive decomposition at certain temperatures, which will likely be present while the engine is operating. The chemistry and physics of burning of ammonium perchlorate composite propellant has been extensively and carefully studied. See further the excellent summary article: "Decomposition and Combustion of Ammonium Perchlorate" Chemical; Jacobs and Whitehead, Review, 1969, 69 (4), pp 551-590 DOI: 10.1021/cr60260a005, Publication Date: August 1969, which is incorporated herein by reference.

TABLE 1

|  | ZENIT-2 stage | % of GLOW | Inv: | SATURN V | % of GLOW | Inv: | SERV | % of GLOW | Inv: | SEA DRAGON | % of GLOW | Inv: |
|---|---|---|---|---|---|---|---|---|---|---|---|---|
| Height (m) | 58.65 |  | 17.5 | 110.6 |  | 31.5 | 20.27 |  | 26 | 150 |  | 55 |
| Diameter (m) | 32.9 |  | 20 | 10.1 |  | 36 | 18.29 |  | 30 | 23 |  | 64 |

TABLE 1-continued

| | ZENIT-2 stage | % of GLOW | Inv: | SATURN V | % of GLOW | Inv: | SERV | % of GLOW | Inv: | SEA DRAGON | % of GLOW | Inv: |
|---|---|---|---|---|---|---|---|---|---|---|---|---|
| GLOW | 444.8 | | 848.4 | 2900* | | 5359 | 2040.8 | | 4079 | 18130 | | 36136 |
| payload | 13.5 | 3.0% | 13.5 | 120 | 4.1% | 120 | 52.8 | 2.6% | 52.8 | 508.5 | 2.8% | 450 |
| Empty Mass of 1st stage | 27.5 | 6.2% | | 131 | 4.5% | | 226.7 | 11.1% | | 1333 | 7.4% | |
| 1st stage propellant | 320.5 | 72.1% | | 2169 | 74.8% | | 1761.3 | 86.3% | | 11466 | 63.2% | |
| Empty Mass of 2nd stage | 8.3 | 1.9% | | 36 | 1.2% | | | | | 465 | 2.6% | |
| 2nd stage propellant | 72.5 | 16.3% | | 444 | 15.3% | | | | | 4357 | 24.0% | |
| % glow of 1st stage | 78% | | | 2900 2300 | 79.3% | | 2040.8 | | | 18130 12799 | 70.6% | |
| % glow of 2nd stage | 18.1% | | | 480 | 16.6% | | | | | 4822 | 26.6% | |
| payload % | 3% | 3% | | | 4.1% | | | | | | 2.8% | |
| structure of 1 + 2 stage | | 8.0% | 85 | 167 | 5.8% | | | | | 1798 | 9.9% | |
| propellant of 1 + 2 stage | | 88.4% | 750 | 2613 | 90.1% | | | | | 29596 | 87.3% | 31655 |
| 1st stage | | | | | | | | | | | | |
| structure | 27.5 | 7.9% | | 131 | 5.7% | | | | | 1333 | 10.4% | |
| Propellant | 320.5 | 92.1% | | 2169 | 94.3% | | | | | 11466 | 89.6% | |
| total mass | 348 | | | 2300 | | | | | | 12799 | | |
| 2nd stage | | | | | | | | | | | | |
| structure | 8.3 | 10% | | 36 | 7.5% | | | | | 465 | 9.6% | |
| Propellant | 72.5 | 89.7% | | 444 | 92.5% | | | | | 4357 | 90.4% | |
| total mass | 80.8 | | | 480 | | | | | | 4822 | | |
| propellant per engine 1st stage | 106.7 | | 200** | 723 | | 1400** | 440*** | | 880** | 3822 | | 600** |
| total propellant for 1st stage | 320.0 | | 600 | 2169 | | 4200 | 1761.3 | | 2640 | 11466 | | 22800 |
| Volume of fuel at Density 1.5 | | | 133.3 | | | 933.3 | | | 586.7 | | | 5067 |
| radius of per sphere for 1st stage | | | 3.6M | | | 6.1M | | | 5.2M | | | 10.7 |
| propellant per engine 2nd stage | 72.5 | | 150** | 444 | | 800** | | | 880*** | 4357 | | 700** |
| Volume of fuel at Density 1.5 | | | 100 | | | 533.3 | | | 586.7 | | | 5809 |
| radius of per sphere | | | 3.3M | | | 5.1M | | | 5.2M | | | 11.2M |
| total propellant weight MT | 392.5 | | 750 | 2169 | | 5000 | | | 3520 | 15823 | | 31500 |
| | 750 MT = 88.4% | | | 5000 MT = 93.3% | | 98.4 | If 3520 MT = 86.3% | | 359 | 1655 MT = 87.6% | | 558.8 |
| weight of the structure and payload | | | | | | | | | | | | 4481 |

TABLE 1-continued

| | ZENIT-2 stage | % of GLOW | Inv: | SATURN V | % of GLOW | Inv: | SERV | % of GLOW | Inv: | SEA DRAGON | % of GLOW | Inv: |
|---|---|---|---|---|---|---|---|---|---|---|---|---|
| % weight if structure and payload | | 11.6% | | | 6.7% | | | 13.7% | | | 12.4% | |
| total weight structure + Propellant | | | 848.4 | | | 5359 | | | 4079 | | | 36136 |

*Since several source give a Gross Lift Off weight within a range of 2800 MT to 3000 MT, a weight of 2900 was assumed for this table
**The propellant for the invention was assumed to be double of that used in the corresponding existing and proposed vehicle
***Since the SERV has only one stage the propellant is equally divided among the 4 engines of the 1st and second stage of the present invention.
Note:
all weights are given in Metric Tons.
Volume of fuel is in Meters cubed Table 1 is a data table that shows several parameters related to the distribution of mass between the major elements of actual and proposed space launch vehicles and a space launch apparatus constructed according to the teachings of the present invention that have similar capabilities to launch payloads into space as the comparable space launch vehicle. Table 1 shows inter alia: the gross lift off weight (GLOW) and the percentage of the GLOW that comprises the structural mass of the vehicle, the fuel mass of the vehicle and the vehicle's payload capacity. Actual values of these parameters are shown for the launch vehicles: the two-stage Ukrainian Zenit and the American Saturn V. Table 1 also shows the calculated and proposed values for the Chrysler SERV, which was a proposed as single stage to orbit vehicle; and the Aerojet Sea Dragon, which was a proposed as large two-stage launch vehicle. The table in Table 1 also shows these values for comparable space launch apparatus' constructed according to the teachings of present invention which have similar capabilities as the Chrysler SERV and the Aerojet Sea Dragon. Because the inventor has not yet built and tested the space launch apparatus taught by the present invention, these parametric comparisons between characteristics of operational and proposed launch vehicles are useful to establish the technical credibility of the present invention.

The present invention has more aerodynamic drag during the early phase of the central orbit than the Zenit launch vehicle, the Saturn V launch vehicle, the proposed SERV or the proposed Sea Dragon because it presents a larger surface area to the atmosphere as it accelerates. In the embodiment shown in the specification, the present invention uses a propellant that is a sequentially burning a combination of APCP, which is the same propellant used by the space shuttle solid rocket booster, and gelled kerosene with a non-stoichiometric inclusion within the gel of ammonium perchlorate oxidizer. Additional oxidizer, which may be liquid oxygen, nitrous oxide, or hydrogen peroxide is introduced into the rocket engine combustion chamber from an external source. The oxidizer examples given are for illustration only and should not be considered limiting to the present invention. The ammonium perchlorate composite propellant has a density of 1.7 to 1.8 metric tons per cubic meter. It produces a specific impulse of 277 seconds at sea level and has a density impulse of 476 kg seconds per liter. The kerosene fuel component has a density of about 0.8 metric tons per cubic meter and the density of the ammonium perchlorate oxidizer that is gelled with this kerosene is 1.95 metric tons meter. The amount of these propellant components can be adjusted so that the total density of the propellant used by the present invention is about 1.5 tons per cubic meter. Trade studies can be done on subscale rocket motors to determine the optimum propellant composition for each embodiment of the present invention. For the purpose of this embodiment, a fuel density average of 1.5 metric tons per cubic meter, a specific impulse of 277 and an average density impulse of 300 is assumed. It should be noted that the ammonium chlorate composition propellant burned at the beginning of the flight has a high density impulse and produces higher thrust while the kerosene/ammonium perchlorate propellant that is burned toward the end of the flight will have a specific impulse roughly equal to the second stage performance of the Zenit launch vehicle. These assumption as to aerodynamic drag, the propellant used, propellant density and specific impulse will be assumed and applied towards comparing the operational equivalent of a space launch vehicle constructed according to the teachings of the present invention to the Zenit two stage launch vehicle, the Saturn V launch vehicle and the proposed SERV and Sea Dragon launch vehicles.

As shown in Table 1 the two stage Ukrainian Zenit launch vehicle has a total mass at launch of 448.8 metric tons. It will carry 13.5 metric tons to 200 km low Earth orbit at 51.6° inclination if it is launched from Baikonur cosmodrome in Kazakhstan. At liftoff, the Zenit launch vehicle has a mass distribution of 78% for the first stage, 18.1% for the second stage and 3% for the payload. The structure of the launch vehicle apparatus, including both first and the second stage, is 8% of the total mass and the propellant in the first and second stages is 88.4% of the total mass. The propellants are liquid oxygen and kerosene at a mixture ratio of 2.29 oxidizer to fuel, which produces a specific impulse of 309 seconds at sea level and a density impulse of 294 kg seconds per liter at sea level. These physical characteristics of the Zenit launch vehicle and its propellant defined the operational characteristics of the Zenit launch vehicle during its ascent from the ground to lower Earth orbit.

In order to provide a conservative comparison between the Zenit two-stage launch vehicle and the equivalent embodiment of the present invention, the propellant mass of the first and second stage engines of this embodiment of the present invention has been assumed to use approximately twice the propellant mass of the two-stage Zenit in order to compensate for the greater aerodynamic drag of the present invention. It will be necessary to run a launch trajectory analysis study to specifically define the optimal fuel load for the present invention.

At the conservative assumed propellant mass for the comparative equivalent embodiment of the present invention to the Zenit the present invention will have a GLOW of 848.4 metric ton and a total propellant weight of 750 metric tons for both stages. The propellant mass for the first stage of the present invention at the conservative assumption will be 600 metric tons. Where the present invention uses the spherical rocket motor described in FIG. 5, the mass of propellant for a single first stage engine will be 200 metric ton and the volume of fuel is 133.3 cubic meters and the second stage will have a propellant mass of 150 metric ton and a volume of 100 cubic meters at a density of 1.5. As shown in Table 1 the radius of a single spherical fuel tank will be 3.6 meters in the first stage and 3.3 meters in the second stage. In this embodiment of the present invention of the launch vehicle the space frame consists of equilateral triangular truss structures and the space frame built according to the teachings of the present invention will have a height of 17.5 meters and base width of 20 meters.

The Table 1 also shows mass distribution values for the Saturn five launch vehicle, the proposed Chrysler SERV single stage launch vehicle and the proposed Sea Dragon two-stage launch vehicle; together with mass distribution values for embodiments of the present invention that are operationally similar to these launch vehicles.

The American Saturn five launch vehicle uses its first two stages to put a 120 ton third stage into low earth orbit. It has a gross liftoff weight of between 2800 to 3000 metric tons and its first stage engines produce 3469.7 ton-of-force; which is 34.6 Megan Newton of thrust. Thus the engines produce a thrust at takeoff that is 124% of the Saturn five's mass weight.

A two-stage launch vehicle apparatus constructed according to the teachings of the present invention that is operationally equivalent to the Saturn V launch vehicle will have the characteristics listed in Table 1 (Column 7). The assumptions relating to type of propellant, density and specific impulse are applied towards the comparative equivalent embodiment of the present invention. In order to provide a conservative comparison between the Saturn V launch vehicle and the equivalent embodiment of the present invention, the propellant mass of the first and second stage engines of this embodiment of the present invention has been assumed to use approximately twice the propellant mass of the Saturn V launch vehicle in order to compensate for the greater aerodynamic drag of the present invention. It will be necessary to run a launch trajectory analysis study to specifically define the optimal fuel load for the present invention.

At the conservative assumed propellant mass for the comparative equivalent embodiment of the present invention to the Saturn V the present invention will have a GLOW of 5359 metric tons and a total fuel weight of 5000 metric tons for both stages. The propellant mass for the first stage of the present invention at the conservative assumption will be 4200 metric tons. Where the present invention uses the spherical rocket motor described in FIG. 5, the equivalent propellant mass for a single first stage engine in the present invention will be 1400 metric ton and the volume of propellant will be 933.3 cubic meters and the second stage will have a propellant mass of 800 metric ton and a volume of 533.3 cubic meters at a density of 1.5. As shown in Table 1 each of the spherical fuel tanks will have a radius of 6.1 meters in the first stage and 5.1 meters in the second stage. In an embodiment of the launch vehicle where the space frame consists of equilateral triangular truss structures, the space frame built according to the teachings of the present invention will have a height of 31.5 meters and base width of 36 meters.

The Chrysler SERV example in Table 1 has a lower payload as a percentage of its launch vehicle mass because it is a single stage to orbit launch vehicle and thus does not gain the benefit of dropping off the mass of the first stage as it flies to orbit. Its gross mass at lift off is 2040.8 metric tons and its payload is 52.8 metric tons. The vehicle has a diameter of 18.3 meters and its height is 20.3 meters and its single aero spike engine produces 31.9 Mega Newton of thrust. Extensive launch trajectory analyses and aerodynamic studies were done by Aerojet Corporation on the SERV launch vehicle. Despite the fact that its aspect ratio produces higher aerodynamic drag than any conventional launch vehicle, Aerojet certified that it can fly to orbit as stated in their proposal to NASA. The SERV, as proposed to NASA, used liquid oxygen and liquid hydrogen as propellants, which produces a specific impulse at sea level of 367 seconds and have a density impulse that is very low at 124 kg seconds per liter at sea level. The present invention has a similar aspect ratio to the SERV but uses a propellant mix that has a lower specific impulse. The present invention also drops off its first stage on the way to orbit in order to improve its payload fraction. The purpose of discussing the SERV is to show that a space launch apparatus having the aspect ratio of the present invention is technically credible, despite its higher aerodynamic drag.

The SERV is a single stage launch vehicle, in comparing a launch vehicle constructed according to the teaching of the present invention with similar capabilities as the SERV and comparable to the SERV, the total propellant mass weight of the SERV was applied equally to the 4 spherical rocket motors that will be used in the present invention. The SERV holds a total propellant weight of 1761.3 metric tons at take off. The two-stage launch vehicle apparatus constructed according to the teachings of the present invention which applies the assumptions with regard to propellant, specific impulse and propellant density stated earlier that is comparable to the SERV launch vehicle will have the characteristics listed in Table 1 (Column 10). In order to provide a conservative comparison between the SERV launch vehicle and the equivalent embodiment of the present invention, the total propellant mass of this embodiment of the present invention has been assumed to use approximately twice the total propellant mass of the SERV launch vehicle in order to compensate for the greater aerodynamic drag. It will be necessary to run a launch trajectory analysis study to specifically define the optimal fuel load for the present invention.

At the conservative assumed propellant mass for the comparative equivalent embodiment of the present invention to the SERV the present invention will have a GLOW of 4079 metric tons and a total fuel weight of 3520 metric tons for both stages. The propellant mass for the first stage of the present invention at the conservative assumption will be 2640 metric tons. Where the present invention uses the spherical rocket motors described in FIG. 5, the equivalent propellant mass for a each of the first stage engines will be 880 metric ton and the volume of propellant will be 586.7 cubic meters and the propellant mass for the second stage engine will be 880 metric ton having a volume of 587.7 cubic meters at a density of 1.5. As shown in Table 1 each of the spherical fuel tanks will have a radius of 5.2 meters in the first stage and second stage, because the total propellant mass of the SERV was divided among the 4 motors of the present engines. In an embodiment of the launch vehicle where the space frame consists of equilateral triangular truss structures, the space frame built according to the teachings of the present invention will have a height of 26 meters and base width of 30 meters.

The Aerojet Sea Dragon example in Table 1 has a pay load of 508.5 tons which is approximately 4 times the pay load of the Saturn V. The Sea Dragon was proposed to be launched from the sea and had a Gross loft off weight of 18130 metric ton and was proposed to be 150 meters height with a diameter of 23 meters. The first stage had a single pressure fed, thrust chamber of 36 million kgf thrust, burning LOX/Kerosene. The purpose of discussing the Sea Dragon is to show how the present invention would be adopted to a higher payload.

The two-stage launch vehicle apparatus constructed according to the teachings of the present invention that applied the assumptions in Table 1 and which is operationally equivalent to the Aerojet Sea Dragon launch vehicle will have the characteristics listed in Table 1 (Column 13). The assumptions relating to type of propellant, density and specific impulse are applied towards the comparative equivalent embodiment of the present invention. In order to provide a conservative comparison between the Sea Dragon launch vehicle and the equivalent embodiment of the present invention, the present invention is been assumed to use approximately twice the propellant mass of the Sea Dragon launch vehicle in order to compensate for the greater aerodynamic drag. It will be necessary to run a launch trajectory analysis study to specifically define the optimal fuel load for the present invention.

At the conservative assumed propellant mass for the comparative equivalent embodiment of the present invention to the Saturn V the present invention will have a gross lift off weight of 36136 metric tons and a total fuel weight of 31500 metric tons for both stages. The propellant mass for the first stage of the present invention at the conservative assumption will be 22800 metric tons. Where the present invention uses the spherical rocket motor described in FIG. 5, the equivalent propellant mass for a single first stage engine in the present invention will be 7600 metric ton and the volume of propellant will be 5067 cubic meters and the second stage will have a propellant mass of 8700 metric ton and a volume of 5809 cubic meters at a density of 1.5. As shown in Table 1 the radius of a single spherical fuel tank will be 10.7 meters in the first stage and 11.2 meters in the second stage. In an embodiment of the launch vehicle where the space frame consists of equilateral triangular truss structures, the space frame built according to the teachings of the present invention will have a height of 55 meters and base width of 64 meters.

Table 2 is a data base of the specific impulse of the first stage at sea level and the first stage thrust of the Zenit two stage rocket, the Saturn V and the proposed Chrysler SERVE single stage launch vehicle and the proposed Sea Dragon launch vehicle and the comparative launch vehicle constructed according to the teachings of the present invention. Table 2 also shows the specific impulse of the fuel used in each of the launch vehicles that have been launched and proposed.

Table 2 is a data table listing the specific impulse of the first stage at sea level and the first stage thrust of the Zenit two stage rocket, the Saturn V and the proposed Chrysler SERVE single stage launch vehicle and the proposed Sea Dragon launch vehicle and the comparative launch vehicle constructed according to the teachings of the present invention. Table 2 also shows the specific impulse of the fuel used in each of the launch vehicles that have been launched and proposed.

At takeoff, the Zenit two-stage launch vehicle has a gross lift off weight of 444.8 metric tons and a first stage thrust of 769.8 metric tons of force. This is 7.55 Mega Newton. Thus the takeoff thrust is 173% of the takeoff mass. The equivalent embodiment of the present invention has a total propellant weight of 750 metric tons. Given the assumption stated above, in order to produce a takeoff thrust of 173% of the takeoff mass of this embodiment of the present invention, the first stage engines must produce 1467.7 metric tons of force; which is 14.4 Mega Newton. Since the fuel load of the present invention is about twice the fuel load of the Zenit, it is reasonable it that would require about twice the thrust at takeoff to achieve the same performance. It should be noted that the American space shuttle solid rocket booster produces 14 Mega Newton of thrust and has been operated hundreds of times successfully. Having twice as much fuel in the rocket motors will allow them to burn longer and provide more total impulse. The space shuttle solid rocket booster separates from the space shuttle at an altitude of 45 km. They are then recovered for reuse. The first stage components of the present invention can also be recovered for reuse, as will be described below.

At takeoff, the Saturn V launch vehicle has a gross lift off weight of 2900 metric tons and a first stage thrust of 3469.07 metric tons of force. This is 34.6 Mega Newton. Thus the takeoff thrust is 124% of the takeoff mass. The equivalent embodiment of the present invention has a total propellant weight of 5000 metric tons and gross lift off weight of 5359 metric tons. Given the assumption stated above, in order to

TABLE 2

|  | ZENIT-2 stage | Invention | SATURN V | Invention | SERV | Invention | SEA DRAGON | Invention |
|---|---|---|---|---|---|---|---|---|
| Specific Impulse 1st stage at sea level | 309s |  | 263s |  | 367s |  |  |  |
| Thrust |  |  |  |  |  |  |  |  |
| 1st stage thrust in Ton-Force (metric) | 7.550 MN 769.8 |  | 34.6 MN 3469.07 |  | 31.9 MN 3261.1 |  | 360 MN 36709 |  |
| Ratio to GLOW | 173% |  | 124% |  | 160% |  | 202% |  |
| Required Thrust for bulldog in Ton-Force |  | 1468 |  | 1437 |  | 6526 |  | 73356.08 |
| Required Thrust for bulldog in Mega Newton |  | 14.4 |  | 14.3 |  | 64.0 |  | 730 | produce a takeoff thrust of 124% of the takeoff mass of this embodiment of the present invention, the first stage engines must produce 6645 metric tons of force; which is 65.1 Mega Newton The proposed Chrysler SERV launch vehicle has a gross lift off weight of 2040.8 metric tons and a first stage thrust of 3261.1 metric tons of force at takeoff. This is 31.9 Mega Newton. Thus the takeoff thrust is 160% of the takeoff mass. The equivalent embodiment of the present invention has a total propellant weight of 2640 metric tons and gross lift off weight of 4079 metric tons. Given the assumption stated above, in order to produce a takeoff thrust of 160% of the takeoff mass of this embodiment of the present invention, the first stage engines must produce 6526 metric tons of force; which is 64 Mega Newton.

Figure 7:
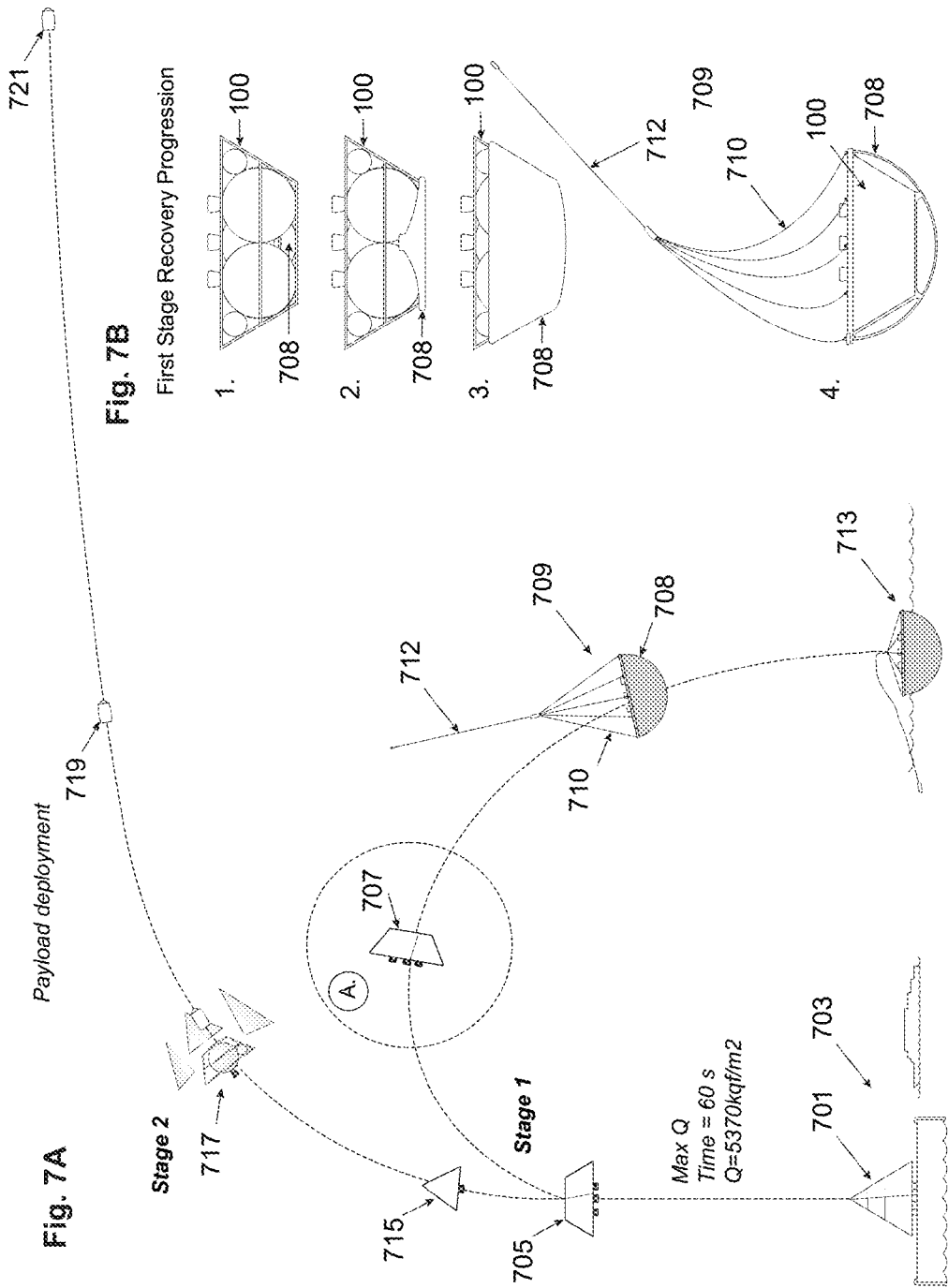
FIG. 7A is an operating cyclogram for a space launch apparatus constructed according to the teaching of the present invention. It illustrates the launch, first and second stage separation operation, first stage reentry and recovery and the second stage and payload ascent to low earth orbit and the orbital payload separation and deployment. It should be noted that depending on the mission of the payload the physical structure of the second stage may be retained attached to the payload and the volume of the interior of the rocket motor may be utilized as a space structure FIG. 7B the shows a four step recovery of the first stage of the present invention. This figure illustrates the aerodynamic position of the first stage during its initial encounter with the atmosphere; the deployment of a reentry thermal protective blanket around the leading edge of the first stage; and the deployment of an aerodynamic hypersonic deceleration apparatus from the trailing edge of the first stage; said deceleration apparatus is also capable of providing attitude control to the reentering first stage. This reentry apparatus and control apparatus is the subject of a separate patent application. It is shown here in order to illustrate the operation of the apparatus of the present invention

At takeoff, the proposed Sea Dragon launch vehicle had a gross lift off weight of 18130 metric tons and a first stage thrust of 36709 metric tons of force. This is 360 Mega Newton. Thus the takeoff thrust is 202% of the takeoff mass. The equivalent embodiment of the present invention has a total propellant weight of 31655 metric tons and gross lift off weight of 36136 metric tons. Given the assumption stated above, in order to produce a takeoff thrust of 202% of the takeoff mass of this embodiment of the present invention, the first stage engines must produce 73356 metric tons of force; which is 730 Mega Newton FIG. 7A shows a cyclogram of the launch, operation and recovery of a space launch apparatus taught by the present invention. In FIG. 7A, the launch vehicle 701 is assembled and then placed in a body of water for launch. The current invention may be launched from a conventional land launch facility, but the Sea Dragon proposal, referenced above, discloses certain benefits of a water launch, particularly for a large launch vehicle. Aerojet Corporation conducted two subscale water launch test programs using smaller rockets. Their program report to NASA said that as much as 95% of the fixed and recurring costs of the launch facility might be eliminated by launching from the water. This report also noted that the water launch significantly reduced the noise level produced by the launching rocket.

In FIG. 7A, a launch vehicle apparatus constructed according to the preferred embodiment of the present invention is shown floating partially submerged in a body of water 703. The inventor believes the present invention can be scaled up to permit the production and operation of large inexpensive launch vehicles. Such vehicles conventionally require extensive inexpensive land-based launch facilities. Alternatively, the present invention may be launched from the ocean. Ocean launch was proposed for very large launch vehicles in the Aerojet Sea Dragon proposal, which is incorporated herein by reference. As part of the work for this early large launch vehicle proposal, two smaller rockets were launched from sea. The first was the program "Sea Bee", which was a proof of principle program to validate the sea-launch concept. A surplus Aerobee rocket was modified so it could be fired underwater. The rocket worked properly the first time. Later tests of repeated firings proved to be so simple that the turnaround cost for launching was 7% that of a new unit. The second test was called "Sea Horse", which demonstrated sea-launch on a larger scale; using a rocket with a complex set of guidance and control systems. It used a surplus 7000 kg force pressure fed acid/aniline Corporal missile on a barge in San Francisco Bay. This rocket was first fired several meters above the water than lowered in successive steps until reaching a considerable depth. Launching the rocket from underwater posed no problems, and it provided substantial noise attenuation.

As shown in FIG. 7A, the first stage engines are guided and the vehicle rises almost vertically to about 32 km altitude. By selecting the correct mixture of fuel components for the first stage engines, an optimal rate of acceleration is selected to allow the vehicle to pass the atmosphere without excessive aerodynamic loading. At 32 km altitude more than 99% of fierce atmosphere is below the launch vehicle. A substantial portion of the first stage fuel is been burned and vehicle mass has been reduced substantially. The vehicle then accelerates to 90 km by burning the second fuel component at a lower thrust over a longer time. At 90 km, the first stage 100 separates 705 from the second stage 200. The second stage rocket motor is ignited 715. This is the same altitude where the first and second stage separation occurs in the two-stage Zenit launch vehicle. The launch vehicle continues to accelerate until it reaches an altitude of 143 km where the payload and second stage fairings are separated 717 from the launch vehicle to reduce the weight of the launch vehicle. This is the same altitude that the Zenit two-stage launch vehicle payload fairing is ejected. The second stage engine continues to burn until the payload and second stage have reached 200 km altitude at about Mach 25 velocity. The payload and second stage are in low Earth orbit.

At this point, shown as 719 on the cyclogram shown in FIG. 7A, the payload may be separated from the second stage. Alternatively the payload and the second stage can remain connected. The second stage of the present invention is a plurality of modular truss structures comprising a space frame and a rocket motor which has expended almost all of its fuel. Most of the rocket motor is empty. The rocket motor is a pressure vessel about 5 m in diameter. This pressure vessel and the modular truss structure of the space frame surrounding it may be used as building materials for space habitats, a large interplanetary spacecraft and the like. Since these materials are already in orbit, it is reasonable to repurpose them for other uses in order to avoid the time and cost of launching similar materials from the earth.

As shown in the cyclogram depicted in FIG. 7A, first stage 100 continues to ascend on a ballistic trajectory until it is at its apogee 707, which is depicted in the cutout FIG. 7B. For example, the space shuttle solid rocket booster separates in between 32 and 45 km altitude, but its residual velocity carries it to an apogee at about 64 to 65 km. The same thing will happen with the first stage of the present invention. If the first and second stage separate at 90 km, the apogee of the first stage will almost certainly be over 100 km, i.e. over the Von Karman limit. It will be in outer space. To be reused, the first stage must reenter the atmosphere and land without significant structural damage. Upon completion of the first stage recovery progression depicted in FIG. 7B, the first stage continues to descend 709 until it reaches land or water 713.

FIG. 7B shows the first stage recovery progression as the first stage 100 reenters the atmosphere. Four steps are shown that are numbered 1 to 4. Step one depicts the first stage 100 at apogee 707 having in a geometric cavity between the three engines a thermal protective recovery blanket that is folded and in compressed 708. Step two shows first stage 100 as it begins to fall back into the atmosphere and the recovery blanket 708 begins to inflate to cover and enclose the first stage 100. Step three shows the thermal protective blanket 708 extending over almost all of the first stage 100. This extension may be done by low-pressure pneumatic tubes woven into the structure of the thermal protective blanket. The thermal protective blanket may be made of material such as Kevlar or Spectra that is physically very strong and also capable of withstanding high thermal loads.

Step four shows a plurality of shroud lines 710 connected to the first stage 100 and also connected to a hypersonic deceleration tether means 712. This hypersonic deceleration tether means is the subject of the inventor's co-pending patent application [U.S. application Ser. No. 14/025,822]. The hypersonic aerodynamic drag produced by this tether could reduce the thermal load on the reentering first stage by approximately a factor of 10. Details of this apparatus may be found in the co-pending application, which is incorporated by reference. This hypersonic aerodynamic decelerate or tether allows some measure of steering by varying the length of the shroud lines and thus changing the angle of attack of the reentering first stage. The mechanism required to provide the thermal protective blanket around the reentering first stage and to provide the hypersonic aerodynamic decelerator tether should not weigh more than a few metric tons and is considered a parasitic weight on the first stage. Detailed aerodynamic reentry analysis will have to be performed on this apparatus to optimize its design and operation.

Figure 8:
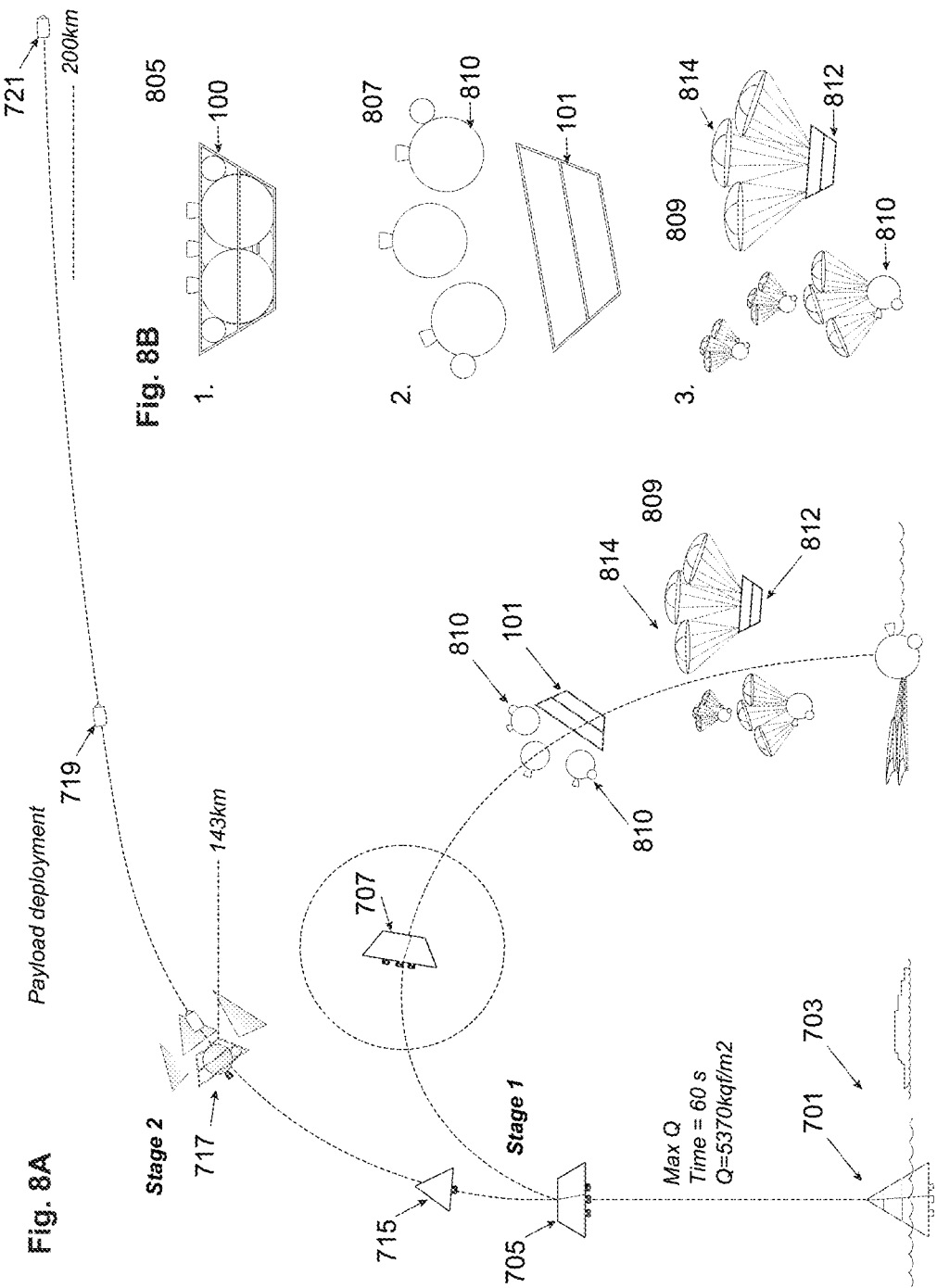
FIG. 8A is an operating cyclogram of another embodiment for a space launch apparatus constructed according to the teaching of the present invention. It illustrates the launch, first and second stage staging operation, first stage reentry and recovery and the second stage and payload ascent to low earth orbit and the orbital payload separation and deployment.
FIG. 8B illustrates the three (3) step recovery of the first stage of the invention in another embodiment of the present invention. This Figure illustrates the aerodynamic position of the first stage, where during the initial encounter with the atmosphere of the first stage the fuel tanks connected to the support structure are disconnected by a pyrotechnic separation method, the deployment of a deceleration apparatus or parachute on each individual spherical fuel tanks and motors and the deployment of a deceleration apparatus or parachute in the support structure. The reentry with a deceleration apparatus is shown here in order to illustrate one embodiment of the reentry of the first stage. It should be noted that the fuel tanks and the support structure can reenter the atmosphere and land without the use of a parachute and with use of an air bag that will be deployed at landing.

FIG. 8A is a different embodiment of the present invention described in a cyclogram of the launch, including the operation and recovery of a space launch apparatus taught by the present invention where when the first stage reenters the lower atmosphere, the first stage elements are disconnected and reenter and land separately. The cyclogram shown in FIG. 8A and FIG. 8B depicts the ascent, separation, and descent of the first and second stages described in FIGS. 7A and 7B and similar elements in FIGS. 7A and 7B have similar numbers. The launch follows the same trajectory described in FIG. 7A. However, as first stage 100 reenters the lower atmosphere where the air is denser, pressure switches, reacting to the increase in aerodynamic pressure, causes the explosive bolts holding the fuel tanks 810 and fuel tank support structure 101 inside the first stage 100 to disconnect 805 from the space frame 101 of the first stage. The fuel tanks are ejected 807 and proceed to a soft landing in the ocean 809 either with or without parachutes 814. The fuel tanks will be empty and very light for their size so they will probably land without any parachute assistance and sustain minimal or no structural damage. They will float in the water because they are empty. This separation will occur at about 5 km altitude. By comparison, the nose separation on the space shuttle's solid rocket booster occurs at 4.7 km altitude. The space frame 101 will deploy three sets of spatial solid rocket booster parachutes 814, one at each vertex of the triangular space frame, and will land in the ocean where airbags will be deployed by contact with water to cause the space frame to float. Each of the three parachute packs on the space frame contains a space shuttle solid rocket booster main chute cluster (three main parachutes+ pilot and drogue chutes.) These weigh about 5 metric tons each and provide 88 tons design load. So these 941 m diameter 120° conical ribbon parachutes have a total design load of over 700 tons and should slow the space frame to velocity of less than 23 m/s at impact with the ocean. The aerodynamic drag produced by the large frontal area of the first stage also will help its aerodynamic deceleration. Detailed aerodynamic modeling of the first age reentry, including high-speed deceleration using the tether and low-speed deceleration using the parachutes must be performed to optimize the recovery operation. The recovery system is estimated to comprise about 5% of the mass stage.

Alternatively, if the tether and parachutes produce sufficient aerodynamic deceleration of the intact first to allow the first stage to be landed intact without incurring significant damage, it would be practical to land the entire stage, rather than separating the first stage components and having them land separately. If the first stage 100 decelerates sufficiently this entire first stage 100 could land in the ocean without structural damage to it.

Figure 9:
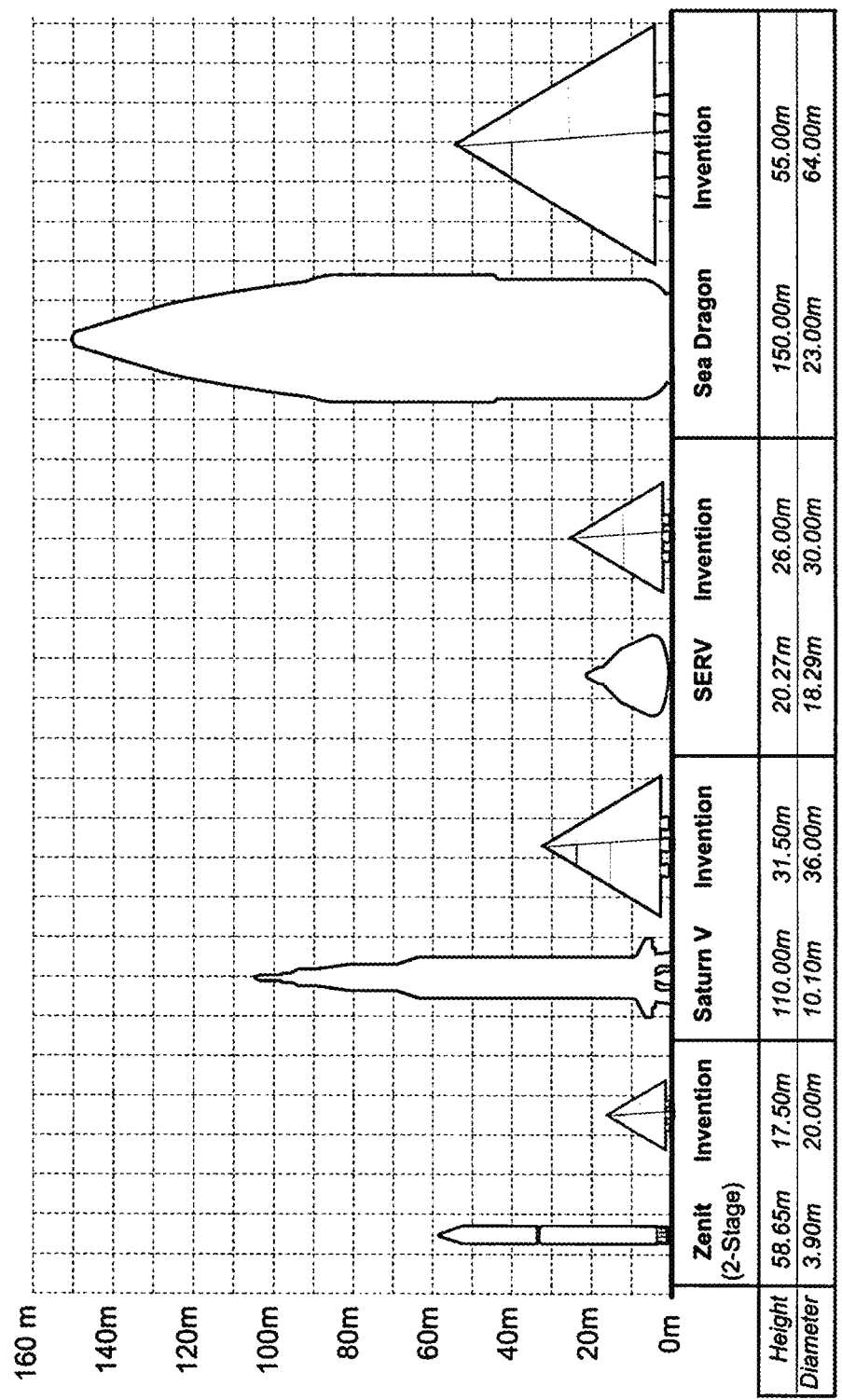
FIG. 9 is comparisons of size for four (4) actual and proposed space launch apparatus' for a range of payloads and comparison of size of the space launch apparatus constructed according to the teachings of the present invention with the similar payloads

FIG. 9 shows physical size of the launch vehicles is parametric data as given in Table 1 together with the size the space launch apparatus taught by the present invention that has the same parametric data as the actual launch vehicles. The purpose of this is to show the relative size of the launch vehicles, including their aspect ratio, for the historic actual and proposed launch vehicles and for lunch apparatus constructed according to the teachings of the present invention. It should be recognized that the historic and proposed launch vehicles are very difficult to transport and erect because of their large size. Aside from being smaller than an equivalent conventional launch vehicle because of the volumetric efficiency taught by the present invention; the modular space frame structure of the present invention is constructed from modular truss elements they can be manufactured and then transported conveniently and inexpensively to the launch site where they can be assembled is a "kit of parts" together with the engines, payload, recovery and landing systems and all of the systems required to make the vehicle operational. Because the rocket motors of the present invention are shown in this specific embodiment are spheres, the pressure vessels are simple to construct and hold the maximum volume of fuel for the amount of structure required to construct the pressure vessel.

Introduction to the Ascent Analysis

The inventor has not yet been able to conduct wind tunnel or flight tests of the invention. In the absence of these experimental results, in order to give information about the performance of the present invention, an ascent trajectory analysis was performed on the present invention at several scales. The present invention is called the "Bulldog" launch vehicle for the purpose of this ascent analysis. The Bulldog is a multi-stage, pyramid-shaped launch vehicle that is rocket powered by proprietary rocket systems. This analysis provides initial trajectory results for three different scaled versions of this vehicle.

Ascent Trajectory Simulation Setup

Ascent flight performance of the Bulldog launch vehicle was evaluated using the 3D version of POST (Program to Optimize Simulated Trajectories) [See further: Capabilities and Applications of the Program to Optimize Simulated Trajectories (POST). Brauer, G. L., Cornick, D. E., and Stevenson, R. NASA CR-2770, February 1977. http://ntrs-.nasa.gov/archive/nasa/casi.ntrs.nasa.gov/19770012832.pdf and Program to Optimize Simulated Trajectories (POST II). Volume II, Utilization Manual. Powell, R. W., et al. NASA Langley Research Center; Brauer, G. L., et al. Lockheed Martin Corporation, May 2000.]

POST has been an industry-standard modeling program that provides for trajectory simulation optimization subject to assumptions and constraints imposed by the user. POST was set up for Bulldog to maximize the remaining mass at orbit injection. Initial input consisted of overall masses and propulsion characteristics of the two stages of the launch vehicle, basic geometry, ascent aerodynamics, launch site locations and injected orbit parameters.

Launch System Mass Definition

Three scaled Bulldog vehicles (1, 2, 3) were sized to match the payload capabilities of land-launched Zenit, Saturn V, and conceptual Sea Dragon launch vehicles (i.e. reference vehicles). Initial usable propellant, burnout, and gross masses for the Bulldog were provided to the author and used in initial POST runs. It was determined revisions in vehicle scales were needed to get payload matches between the Bulldog vehicles and the above mentioned reference vehicles. At this point in the design process for Bulldog, detailed mass statements are not yet available. Thus, a simplified methodology using propellant mass fraction, or pmf, was used for mass estimation where, in this definition, pmf=usable propellant mass/(usable propellant mass+burnout mass)

Usable propellant mass is that propellant mass actually used during ascent. Burnout mass is the dry mass of the stage plus any fluids, residual and reserve propellants.

Figure 10:
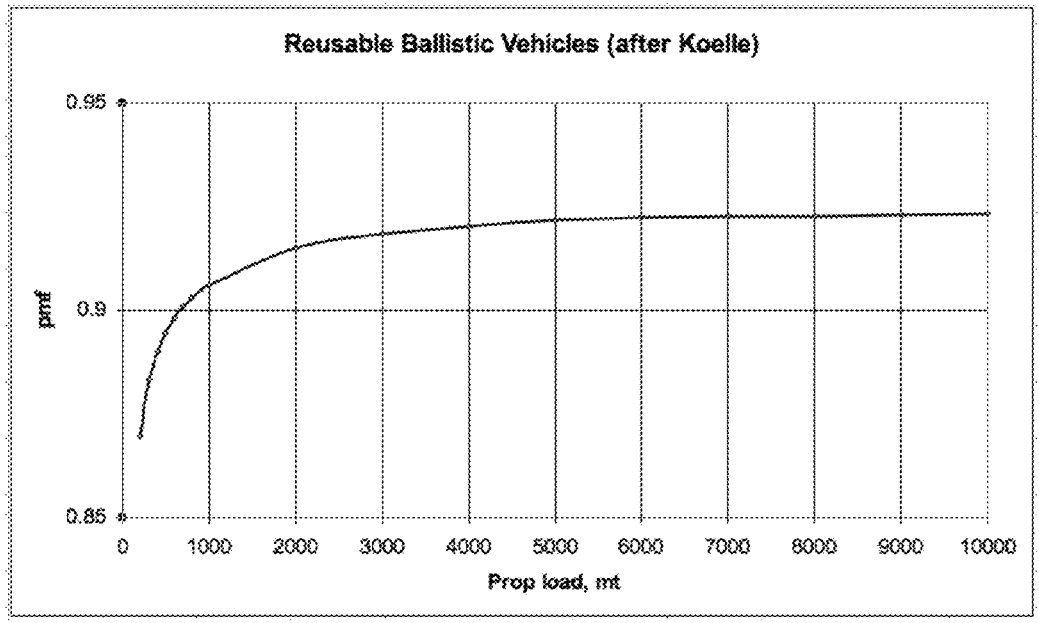

Propellant mass fractions typically vary with the overall propellant load. As total propellant loads increase, pmf increases and produces increased payload fraction. Without specific, detailed mass statements for Bulldog, an alternative approach is to examine prior actual or conceptual vehicles whose pmf are known. Koelle [Handbook of Cost Engineering for Space Transportation Systems with TRANSCOST 7.0. Koelle, D. E. TCS—TransCostSystems. TCS-TR-168 (2000), November 2000] presents a chart of such information for a family of reusable ballistic launch vehicles of which Bulldog could be considered a member. A pmf vs. total propellant load chart was defined from Koelle's information and is presented in FIG. 10.

Given a particular payload mass, the vehicle under study was scaled up or down from initial supplied vehicles until POST determined the total propellant load that provided the correct final orbital mass (payload plus burnout second stage). The pmf was reset using FIG. 1 as the propellant load varied during the POST iterations. It was assumed that the propellant load percentage split between the two stages would be the same as initially supplied to the author for the three scaled Bulldog vehicles.

Propulsion Characteristics

The author was provided with general propulsion characteristics for the stages of the Bulldog launch vehicle. The first stage motors have gelled propellants that will switch composition during ascent and the second stage also has gelled propellants. The assumed vacuum specific impulses of the motors are:

First stage mode 1 (liftoff to switchover): 268 sec
First stage mode 2 (switchover to burnout): 337 sec
Second stage: 350 sec The first stage in mode 1 is based on the propellant type used by the Space Shuttle solid rocket boosters. The first stage in mode 2 is based on the RD-171 used in the Zenit launch vehicle using kerosene and liquid oxygen. The second stage is based on the specific impulse of the second stage of the Zenit launch vehicle using kerosene and liquid oxygen.

Thrust requirements were determined as follows. From the author's experience, the sea level thrust at liftoff that maximizes payload is set at 1.3 times the vehicle liftoff mass (or T/W). This can be varied, but too low a number increases gravity losses whereas too high a number increases drag losses. The final payload mass is relatively insensitive to a range from 1.2 to 1.4.

POST requires general propulsion characteristics of engine vacuum thrust, vacuum specific impulse and nozzle exit area. A factor of 1.0897 was used to multiply first stage sea level thrust to determine vacuum thrust. This was based on the RD-171 engine, but is fairly typical for many rocket engines. The engine flow rates are determined from:

Flow rate=Thrust vacuum/Specific impulse vacuum

The exit area is determined from:

Exit area (sq m)=(Thrust vacuum (mt)−Thrust sea level (mt))/22780

The first stage burns propellants at high thrust and lower specific impulse. It was assumed that the switch over to mode 2 (lower thrust, higher specific impulse) occurs at 70 seconds after liftoff—past the point of maximum dynamic pressure. In future studies, this time can be varied to determine impacts on maximum dynamic pressure and payload. The vacuum thrust mode 2 was assumed to be 75% of the thrust in mode 1.

POST will determine the end of first stage burn when the propellant consumed equals the usable propellant load. Two seconds after all usable propellants are consumed, the two stages are separated. Six seconds after that, the second stage engine ignites. A typical thrust level at staging is the thrust (mt) is equal to the staging mass (mt) although lower thrust can be used. Future POST simulations would examine the impact of varying initial second-stage thrust on payload capability.

Geometry

Figure 11:
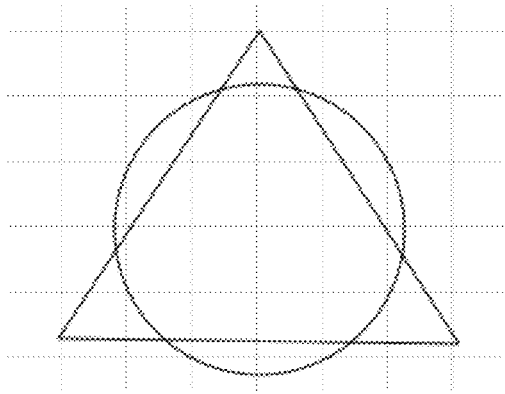

OST requires a couple of input values for geometry—the reference area for aerodynamics calculations and a reference length. The reference area is based on the SERV launch vehicle that uses a circular planform area for aerodynamics coefficients. Since Bulldog has a triangular planform area, it was decided to approximate an equivalent circular reference area using the length of the triangular side as a diameter. FIG. 11 shows this approximation.

Aerodynamics

Figure 12:
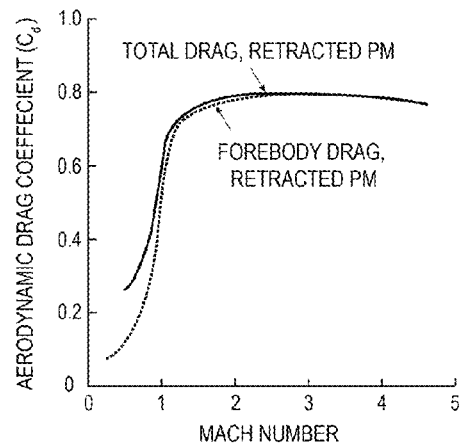

SERV ascent aerodynamics were used to estimate ascent aerodynamics. The vehicle follows a near-zero lift trajectory. Drag is calculated using the drag coefficient vs. Mach number for the Chrysler SERV (FIG. 12).

1. Mach number: 0.0, 0.5, 1.0, 1.5, 2.0, 3.0, 4.0, 5.0, 6.0, 7.0. 8.0 and 25.0
2. Drag Coefficient: 0.266, 0.266, 0.618, 0.763, 0.793, 0.800, 0.787, 0.787, 0.787, 0.787
3. Lift: 0.0
4. Reference Area: Bulldog 1: 326.6 sq m; Bulldog 2: 857.3 sq m,
   Bulldog 3: 2316.4 sq m Launch Sites
For Zenit equivalent Bulldog 1.
   Baikinor: Latitude: 45.9 deg North
   Longitude: 63.7 deg East
For Saturn V equivalent Bulldog 2
   KSC: Latitude: 28.5 deg North
   Longitude: 80.0 deg West
For Sea Dragon equivalent Bulldog 3
   KSC: Latitude: 28.5 deg North
   Longitude: 80.0 deg West Injection Orbit Parameters
For Zenit equivalent Bulldog 1.
   Altitude: 200 km (108 nmi) circular
   Inclination: 51.4 deg
For Saturn V equivalent Bulldog 2
   Altitude: 200 km (108 nmi) circular
   Inclination: 28.5 deg
For Sea Dragon equivalent Bulldog 3
   Altitude: 185 km (100×300 nmi) then burn to 300 nmi circular
   Inclination: 28.5 deg Additional Assumptions and Constraints
1. 1976 U.S. Standard Atmosphere and no winds
2. Second-stage payload fairings jettisoned at 295 sec (as for Zenit). In future POST simulations the fairings will be jettisoned when the free-molecular heating rate (FMHR) has decreased to a value of 0.1 BTU/ft2-sec.
3. Maximum g forces: Bulldog 1: 4.06 (Zenit limit) Bulldog 2 & 3: 4.00

Only Bulldog 2 reaches the g limit briefly during first stage burn. However, all vehicles reach the g limit during second-stage burn. This can be constrained by continuously reducing thrust from the second stage engine, or by doing a single step-down to lower thrust during the burn. This has implications in the propellant design for Bulldog. Future simulations will also look at reducing the staging thrust/weight to lower values to reduce or eliminate reaching the g limit. This has implications for reduced payload.

Bulldog Results

Geometry and mass statements for the three Bulldog vehicles are given in FIG. 13.

FIG. 14 shows trajectory events for each of the Bulldog vehicles. It is noted that these events vary in time not just because of a scaling effect, but that the propellant percentage between the first and second stages vary from vehicle to vehicle as supplied to the author. Future POST analysis will look to normalize out this difference. It is also noted that vehicle geometry will play a key role in determining this propellant split between the stages.

FIG. 15 shows how these vehicles compare with the Zenit, Saturn V, and Sea Dragon in gross liftoff mass. Also shown are the Bulldog vehicle masses as originally supplied to the author. Refinements in the propellant mass fractions reduced the overall masses.

Bulldog 1 Trajectory Simulation

Figure 16:
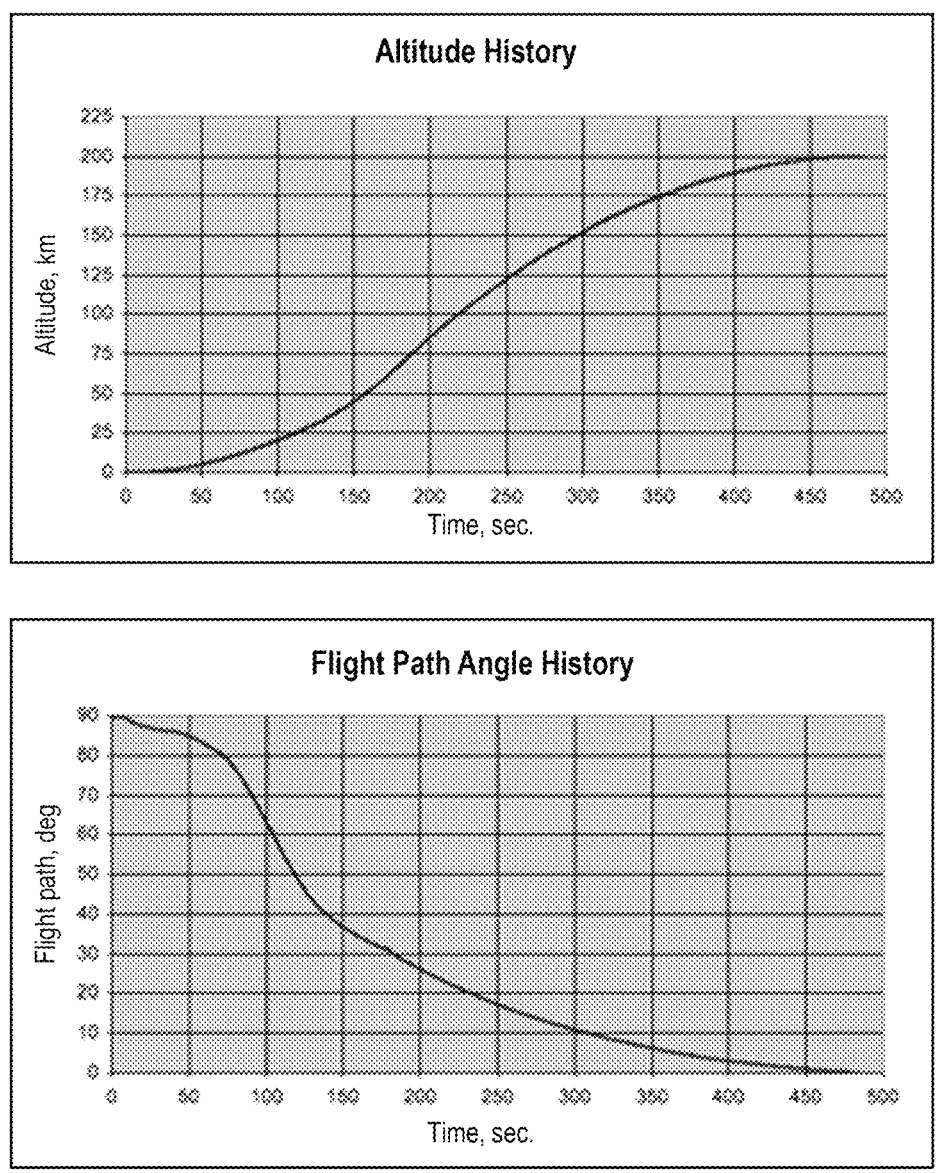
Figure 17:
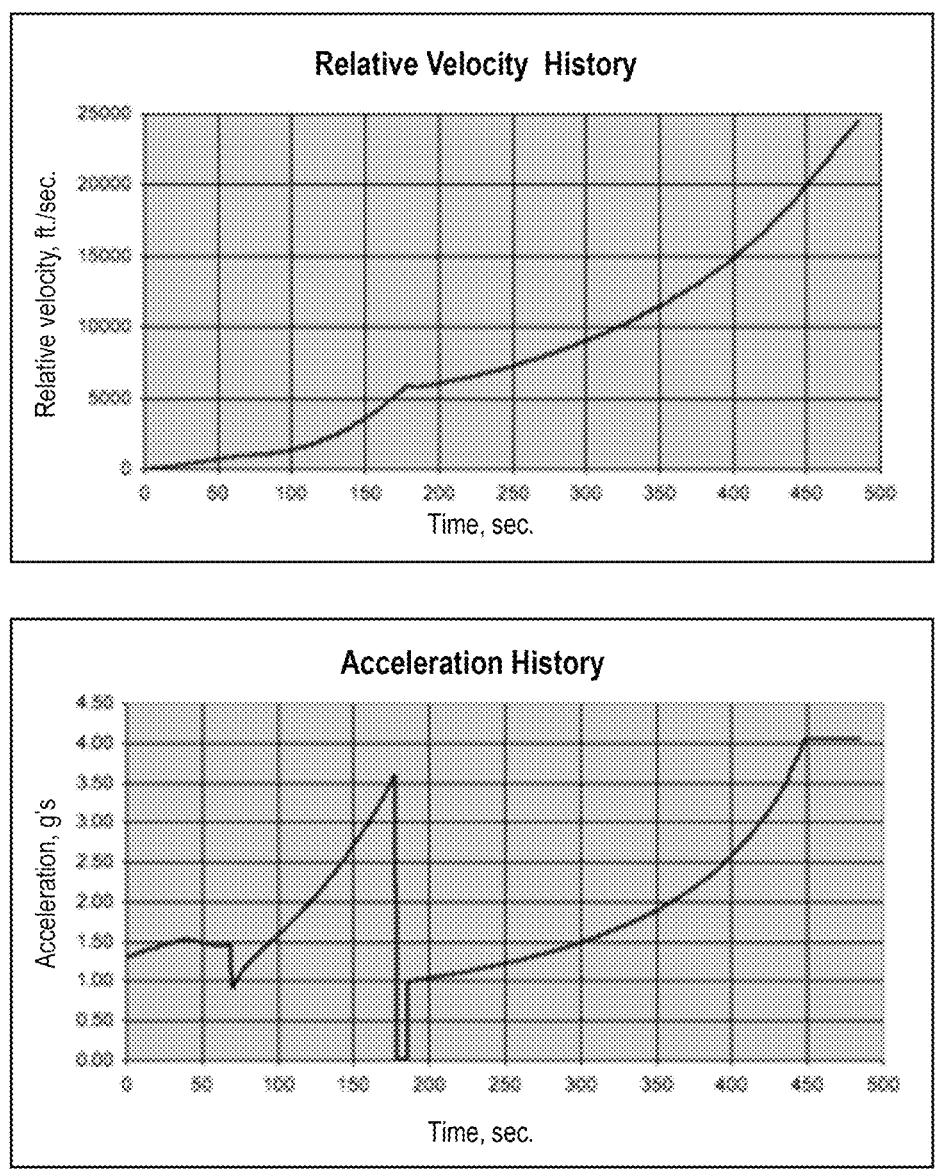
Figure 18:
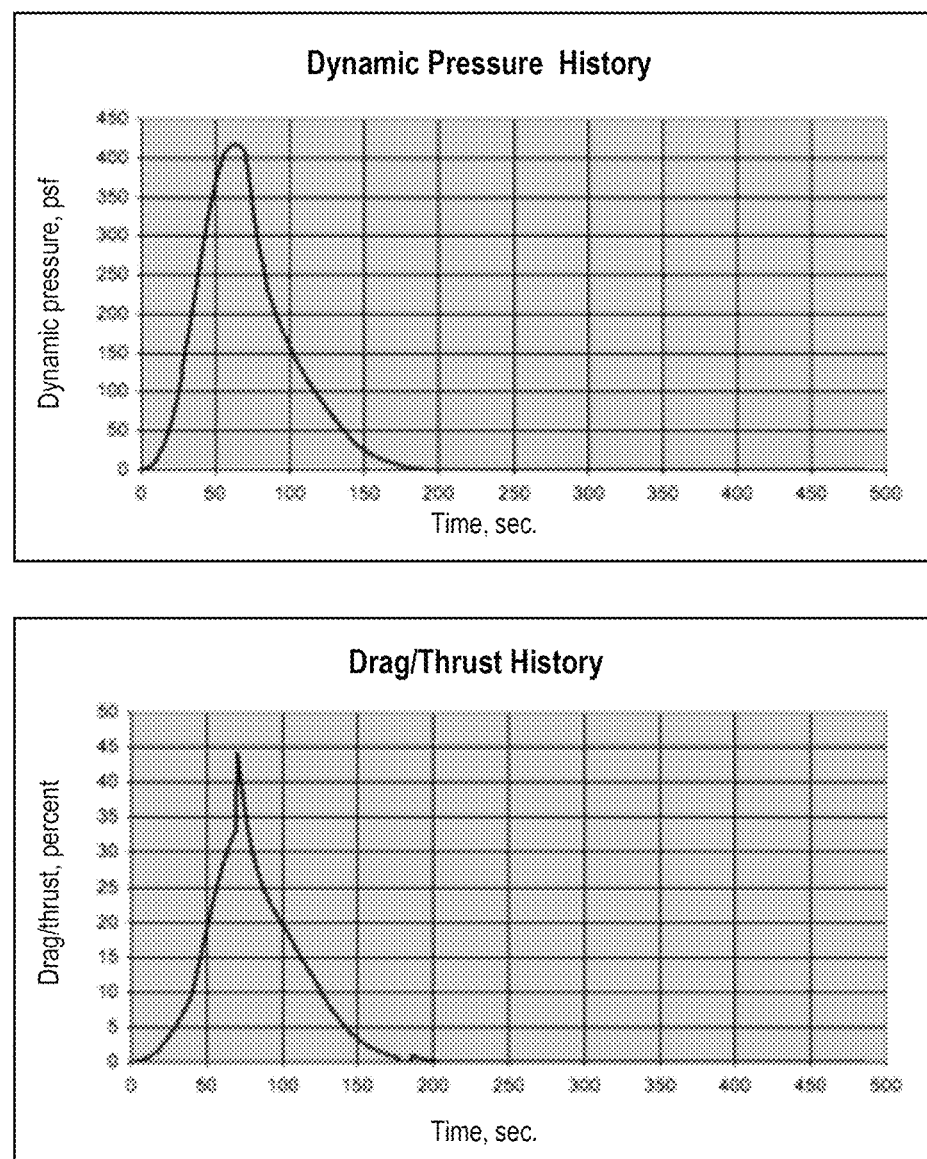

FIGS. 16, 17 and 18 show several trajectory parameters for the Bulldog 1 launch vehicle (Zenit equivalent).

Bulldog 1 is in nearly a vertical climb during the first ~70 seconds after liftoff (varying from 90 deg to 80 deg climb angle). Thereafter, the vehicle starts to arc over in the trajectory during Mode 2 first-stage burn as it exits the densest part of the atmosphere.

It is clear during the initial Mode 1 first-stage burn that drag is taking a toll on this vehicle as the vehicle is holding a near-constant acceleration of 1.5. Acceleration drops to ~1.0 at the switchover to Mode 2, but then does rapidly build as the vehicle drag decreases and the vehicle is able to arc over towards horizontal flight. The switchover to the second-stage thrust is evident by the initial lower acceleration, but eventually it does reach the 4.0 g limit as the vehicle achieves horizontal flight where gravity losses are non-existent.

FIG. 18 shows the dynamic pressure buildup reaching a peak of 418 psf. Note the drag as a percentage of thrust spikes at nearly 45%. Despite these high values, POST is optimizing the overall trajectory to minimize total drag and gravity losses.

Bulldog 2 Trajectory Simulation

Figure 20:
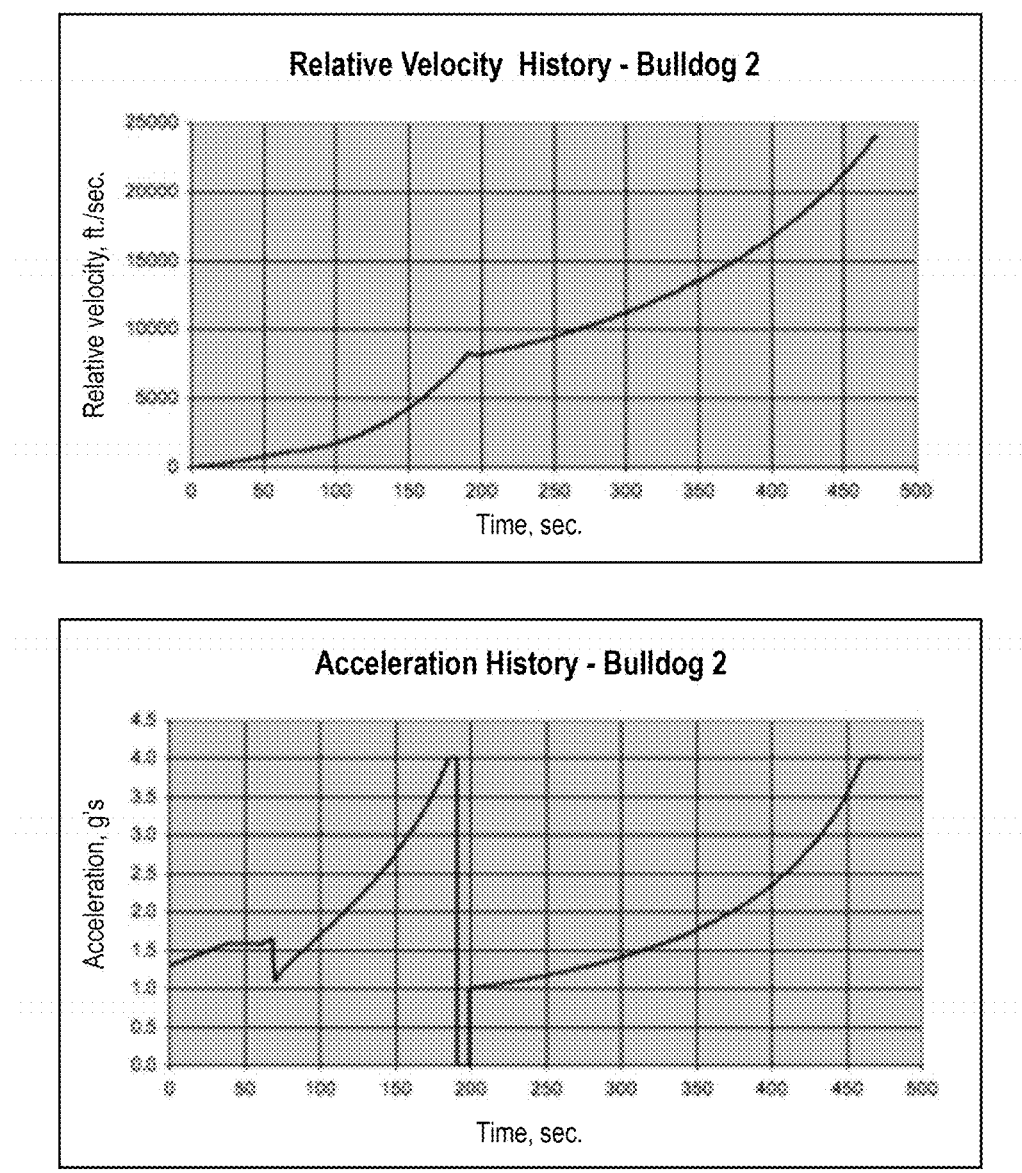
Figure 21:
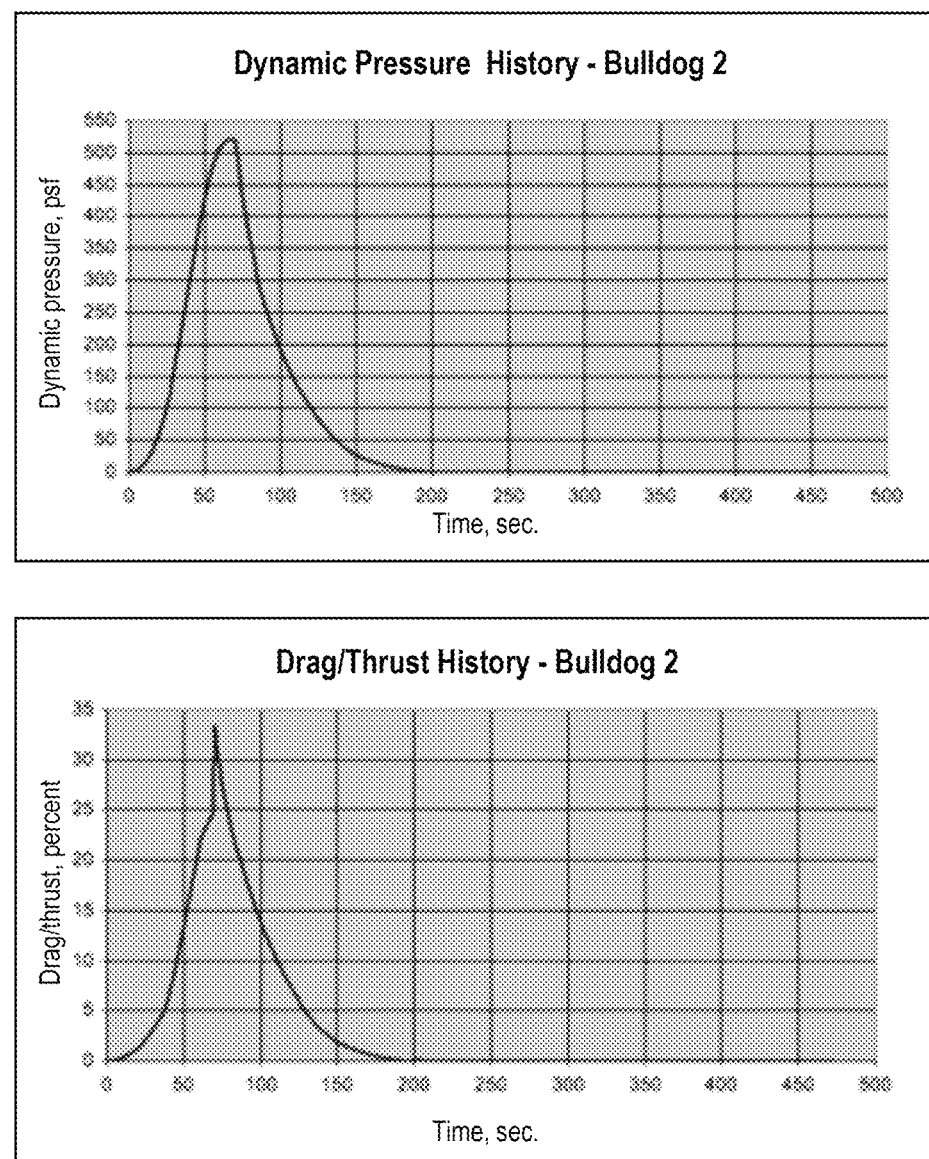

FIGS. 19, 20 and 21 show several trajectory parameters for the Bulldog 2 launch vehicle (Saturn V equivalent).

For Bulldog 2 the flight-path angle reduces more quickly than for Bulldog 1. Also, in FIG. 21, even though the maximum dynamic pressure is higher than for Bulldog 1 (520 psf vs. 418 psf), the peak drag/thrust percentage is lower than for Bulldog 1 (33% vs. 45%). This is because, whereas the drag is varying with planform area, the thrust is varying primarily with vehicle mass, which is a strong function of volume.

The acceleration history for Bulldog 2 is a little different since it briefly reaches a 4.0 g limit during Mode 2 first stage burn whereas Bulldog 1 did not. This is in line with the somewhat lower impacts of drag for the larger vehicle.

Bulldog 3 Trajectory Simulation

Figure 24:
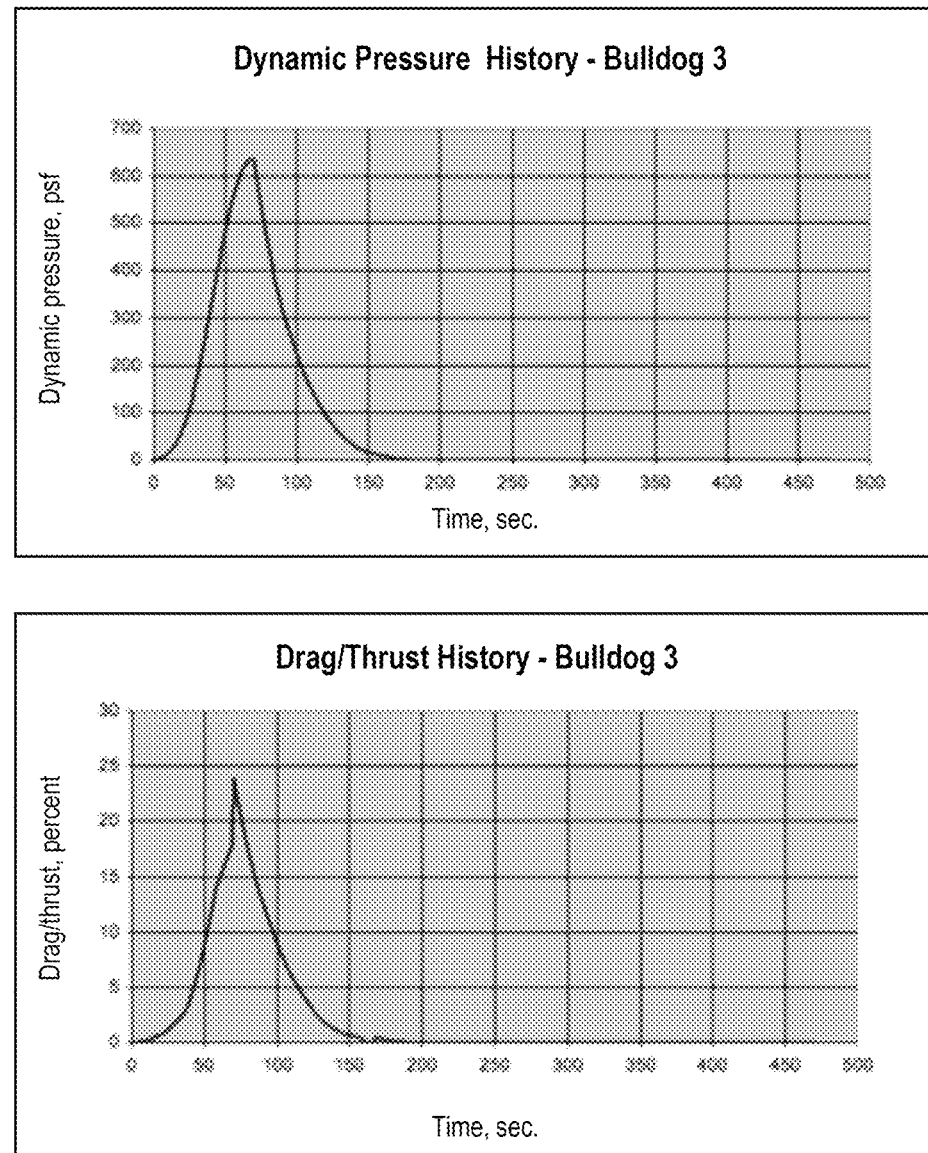

FIGS. 22, 23 and 24 show several trajectory parameters for the Bulldog 3 launch vehicle (Sea Dragon equivalent).

For Bulldog 3, the vehicle begins a tilt towards horizontal flight earlier than for the other Bulldog vehicles thus showing the decreasing role of drag in the overall optimization of maximum injection mass. This vehicle is different than Bulldog 1 and 2 in that the orbital injection is to an elliptical orbit 100×300 nmi (injection point 185 km) to simulate the Sea Dragon mission.

The acceleration level during first stage burn falls well short of 4 g's. One reason is that this vehicle has the highest percentage of second-stage propellant. Thus, the first stage burns out at the earliest time of the three vehicles (see Table II). On the other hand the second stage burns for the longest time of the three vehicles in part because of the higher mass of propellant available, but also due to the higher injection velocity required to reach the 100×300 nmi orbit. In addition, there is another burn of the second stage required to circularize the orbit at 300 nmi—the apogee of the 100×300 nmi orbit. This vehicle has the highest maximum dynamic pressure (637 psf). But the drag/thrust percentage is the lowest of the three vehicles (24% & vs. 33% and 45% for Bulldog 2 and Bulldog 1 respectively).

Trajectory Conclusions from this POST Ascent Analysis of the Present Invention:

An initial set of trajectory simulations has been obtained for three scaled Bulldog vehicles. Each represents a usable trajectory based on the input parameters and constraints. The analysis, however, has pointed out some follow-on work that can improve these initial results.

First, the propellant splits between the first and second stage as shown at the bottom of Table 1 should be made consistent with scaling.

Second, there is an optimization to be performed to examine whether a lower second-stage initial thrust (assumed to be T/W=1.0) will impact injected mass much and may allow a reduction or elimination of reaching a 4.0 g limit. This has an impact on the design of the specific solid and gelled propellants used in the present inventions pseudo-hybrid nonstoichiometric rocket motors.

Suborbital Sounding Rocket Embodiment of the Present Invention:

FIG. 25 is a geometric sketch for an embodiment of the present invention at the scale of a reusable suborbital sounding rocket vehicles with a mass of about 10 metric tons; comparing the suborbital embodiment of the present invention, called Bulldog SR-1, with the ISAS/JAXA (Japanese-2009) suborbital sounding rocket, each vehicle having a launch mass of about 10 metric tons and a 100 kg suborbital payload. The figure of merit for a sounding rocket is the quality and duration of the microgravity experienced by the payload. The table in FIG. 25 shows the calculated characteristics of three suborbital embodiments of the present invention having payload mass fractions of 0.65, 0.70 and 0.75.

For the same basic mass properties and propulsion as ISAS/JAXA, Bulldog's ascent drag has a significant impact on its use as a single-stage sounding rocket in terms of altitude achieved and microgravity times. However, as is shown in the table in FIG. 25, with careful empty mass control, Bulldog can function as well or better than the ISAS/JAXA vehicle.

The scalability of the present invention from a small sounding rocket to an ultra-heavy orbital launch vehicle is a significant advantage of the present invention. This scaling occurs because as the vehicle gets larger more the vehicle is fuel and less of it is structure. That is the payload mass fraction benefits as the size the vehicle gets larger because the fraction of the vehicle that comprises fuel becomes larger faster than the growth in mass of the vehicle's structure. The inventor of the present invention believes that the structural mass of the vehicle gross it a function that is the square of the vehicles linear size, while the mass of the fuel increases as a function of the cube of the vehicles linear size (linear size being the size of one edge of the triangular structure of the present invention.)

Although specific embodiments of the present invention have been described in this written description and the accompanying drawings, these embodiments are illustrative of the invention for the purpose of allowing those skilled in the art to make and use the invention. Those skilled in the art will be able to use the invention in many other embodiments without departing from the teachings of the present invention. Thus these embodiments illustrated should not limit the scope of the invention, which is limited only by the appended claims and their equivalents.

The invention claimed is:

1. A space launch apparatus;
    wherein said space launch apparatus comprises a first stage; and
    wherein said first stage comprises:
        a first stage space frame having a top, a bottom, an outer perimeter, and an interior perimeter that defines an interior space, wherein said first stage space frame has a truncated pyramidal shape; and
        a plurality of first stage rocket motors, wherein said first stage space frame comprises a system of truss members configured to mount said plurality of first stage rocket motors completely within said interior space of said space frame in a closely-packed configuration.

2. The space launch apparatus of claim 1 wherein said top of said first stage space frame is shaped like an equilateral triangle.

3. The space launch apparatus of claim 1 wherein said bottom of said first stage space frame is shaped like an equilateral triangle.

4. The space launch apparatus of claim 1, wherein system of truss members comprises a plurality of truss members that have ends, wherein said an end of an individual truss member is fixedly attached to an end of one other truss member at one of a plurality of vertices; and
    wherein said vertices form a geometric pattern.

5. The space launch apparatus of claim 1, wherein each of said first stage rocket motors has an interior and said interior space further comprises:
    a plurality of first stage propellant component tanks that has an interior, and
    a plurality of propellant lines;
    wherein each of said first stage propellant tanks is connected to a first stage rocket motor by a propellant line such that the interior of said first stage propellant component tank is in fluid communication with the interior of said first stage rocket motor.

6. The space launch apparatus of claim 5 wherein said first stage propellant component tanks are generally spherical.

7. The space launch apparatus of claim 5, wherein at least one of said first stage rocket motors is fixedly attached to said first stage space frame's interior perimeter.

8. The space launch apparatus of claim 1 wherein said first state rocket motors are generally spherical.

9. The space launch apparatus of claim 1, wherein said first stage rocket motors are fixedly attached to one another.

10. The space launch apparatus of claim 1, further comprising a plurality of first stage propellant component tanks;
    wherein said first stage propellant tanks are disposed tangent to said first stage rocket motors; and
    wherein at least one of said first stage propellant tanks is disposed tangent to said first stage space frame's interior perimeter.

11. The space launch apparatus of claim 1 further comprising aerodynamic fairings attached to said outer perimeter of said first stage space frame.

12. The space launch apparatus of claim 1, further comprising a second stage;
    wherein said second stage comprises:
        a second stage space frame having a top, a bottom, an outer perimeter, and an interior perimeter that defines an interior space; and
        at least one rocket motor mounted within said interior space of said second stage space frame and attached to said interior perimeter of said second stage space frame.

13. The space launch apparatus of claim 12, wherein each of said first and second stage rocket motors are arranged in a closely packed configuration.

14. The space launch apparatus of claim 13, wherein said second stage space frame comprises a plurality of second stage truss members having ends,
    wherein an end of an individual second state truss member is fixedly attached to an end of one other second stage truss member at one of a plurality of vertices; and
    wherein said vertices form a geometric pattern.

15. The space launch apparatus of claim 13, wherein said second stage space frame's top is shaped like an equilateral triangle.

16. The space launch apparatus of claim 13, wherein each of said second stage rocket motors has an interior and said second stage interior space further comprises:
    a second stage propellant component tank that has an interior, and
    a propellant line,
    wherein said spherical second stage propellant tank is connected to said second stage rocket motor by said propellant line such that the interior of said second stage propellant component tank is in fluid communication with the interior of said second stage rocket motor.

17. The space launch apparatus of claim 12, wherein each of said first and second state rocket motors are generally spherical.

18. The space launch apparatus of claim 12, wherein the bottom of said second stage space frame is attached to the top of said first stage space frame by pyrotechnic bolts.

19. The space launch apparatus of claim 12, wherein said second stage space frame's bottom is shaped like an equilateral triangle.

20. The space launch apparatus of claim 12, further comprising:
    at least one first stage fairing attached to said exterior perimeter of said first stage space frame; and
    at least one second stage fairing attached to said exterior perimeter of said second stage space frame.

21. The space launch apparatus of claim 12, further comprising a payload carrier, wherein said payload carrier comprises:

a payload carrier space frame having a bottom, an exterior perimeter, and an interior perimeter defining an interior space wherein a payload may be mounted, wherein said bottom of said payload carrier space frame attaches to said top of said second stage space frame.

22. The space launch apparatus of claim 21, further comprising:
at least one first stage fairing attached to said exterior perimeter of said first stage space frame; and
at least one second stage fairing attached to said exterior perimeter of said second stage space frame; and
at least one payload fairing attached to said exterior perimeter of said payload space frame.

23. The space launch apparatus of claim 21, wherein said first stage space frame's exterior perimeter, said second stage space frames exterior perimeter, and said payload carrier space frame's exterior perimeter, collectively have the general shape of a regular tetrahedron.

24. The space launch vehicle apparatus of claim 21, wherein the base width to height ratio is no greater than 6:5.

* * * * *